Oct. 19, 1965 J. A. HADDAD ETAL 3,213,373

ARITHMETIC UNIT FOR AN ELECTRONIC DATA PROCESSING MACHINE

Original Filed March 30, 1954 21 Sheets-Sheet 1

INVENTORS
J. A. HADDAD
R. K. RICHARDS
N. ROCHESTER
H. D. ROSS JR

BY JOHN F. HANIFIN
ATTORNEY

ARITHMETIC UNIT FOR AN ELECTRONIC DATA PROCESSING MACHINE

INVENTORS
J. A. HADDAD
R. K. RICHARDS
N. ROCHESTER
H.D. ROSS JR.

ARITHMETIC UNIT FOR AN ELECTRONIC DATA PROCESSING MACHINE

Original Filed March 30, 1954 21 Sheets-Sheet 3

INVENTORS
J.A. HADDAD
R.K. RICHARDS
N. ROCHESTER
H. D. ROSS JR

ARITHMETIC UNIT FOR AN ELECTRONIC DATA PROCESSING MACHINE

Original Filed March 30, 1954 21 Sheets-Sheet 4

INVENTORS
J. A. HADDAD
R. K. RICHARDS
N. ROCHESTER
H. D. ROSS, JR.

ARITHMETIC UNIT FOR AN ELECTRONIC DATA PROCESSING MACHINE

Original Filed March 30, 1954 21 Sheets-Sheet 5

INVENTORS
J. A. HADDAD
R. K. RICHARDS
N. ROCHESTER
H. D. ROSS JR.

ARITHMETIC UNIT FOR AN ELECTRONIC DATA PROCESSING MACHINE

Original Filed March 30, 1954 21 Sheets-Sheet 6

INVENTORS
J.A. HADDAD
R.K. RICHARDS
N. ROCHESTER
H.D. ROSS JR.

ARITHMETIC UNIT FOR AN ELECTRONIC DATA PROCESSING MACHINE

Original Filed March 30, 1954

INVENTORS
J.A. HADDAD
R.K. RICHARDS
N. ROCHESTER
H.D. ROSS, JR.

CARRY AND OVERFLOW TRIGGERS

SIGN MIXER

INVENTORS
J. A. HADDAD
R. K. RICHARDS
N. ROCHESTER
H. D. ROSS JR.

Oct. 19, 1965 J. A. HADDAD ET AL 3,213,373

ARITHMETIC UNIT FOR AN ELECTRONIC DATA PROCESSING MACHINE

Original Filed March 30, 1954 21 Sheets-Sheet 9

INVENTORS
J. A. HADDAD
R. K. RICHARDS
N. ROCHESTER
H. D. ROSS JR.

ARITHMETIC UNIT FOR AN ELECTRONIC DATA PROCESSING MACHINE

Original Filed March 30, 1954 21 Sheets-Sheet 10

INVENTORS
J. A. HADDAD
R. K. RICHARDS
N. ROCHESTER
H. D. ROSS JR.

ARITHMETIC UNIT FOR AN ELECTRONIC DATA PROCESSING MACHINE

Original Filed March 30, 1954 21 Sheets-Sheet 11

INVENTORS
J. A. HADDAD
R. K. RICHARDS
N. ROCHESTER
H. D. ROSS JR.

ARITHMETIC UNIT FOR AN ELECTRONIC DATA PROCESSING MACHINE

Original Filed March 30, 1954 21 Sheets-Sheet 12

INVENTORS
J. A HADDAD
R. K. RICHARDS
N. ROCHESTER
H. D. ROSS JR.

INVENTORS
J. A. HADDAD
R. K. RICHARDS
N. ROCHESTER
H. D. ROSS JR.

INVENTORS
J. A. HADDAD
R. K. RICHARDS
N. ROCHESTER
H. D. ROSS JR.

INVENTORS
J. A. HADDAD
R. K. RICHARDS
N. ROCHESTER
H. D. ROSS JR.

INVENTORS
J. A HADDAD
R. K RICHARDS
N. ROCHESTER
H.D. ROSS JR.

ACCUMULATOR REGISTER
S ORDER

ACCUMULATOR REGISTER
ORDERS Q, P, AND 1 through 35

MQ REGISTER
ORDERS S, AND 1 through 35

INVENTORS
J. A. HADDAD
R. K. RICHARDS
N. ROCHESTER
H. D. ROSS JR.

INVENTORS
J. A. HADDAD
R. K. RICHARDS
N. ROCHESTER
H. D. ROSS JR.

SUBTRACT

LONG SHIFT LEFT 3,213,373

ARITHMETIC UNIT FOR AN ELECTRONIC DATA PROCESSING MACHINE

Jerrier A. Haddad, Binghamton, Richard K. Richards, Poughkeepsie, Nathaniel Rochester, Wappinger Falls, and Harold D. Ross, Jr., Poughkeepsie, N.Y., assignors to International Business Machines Corporation, New York, N.Y., a corporation of New York Original application Mar. 30, 1954, Ser. No. 419,642, now Patent No. 2,974,866, dated Mar. 14, 1961. Divided and this application June 29, 1960, Ser. No. 42,457
5 Claims. (Cl. 328—37)

Figure 1A:
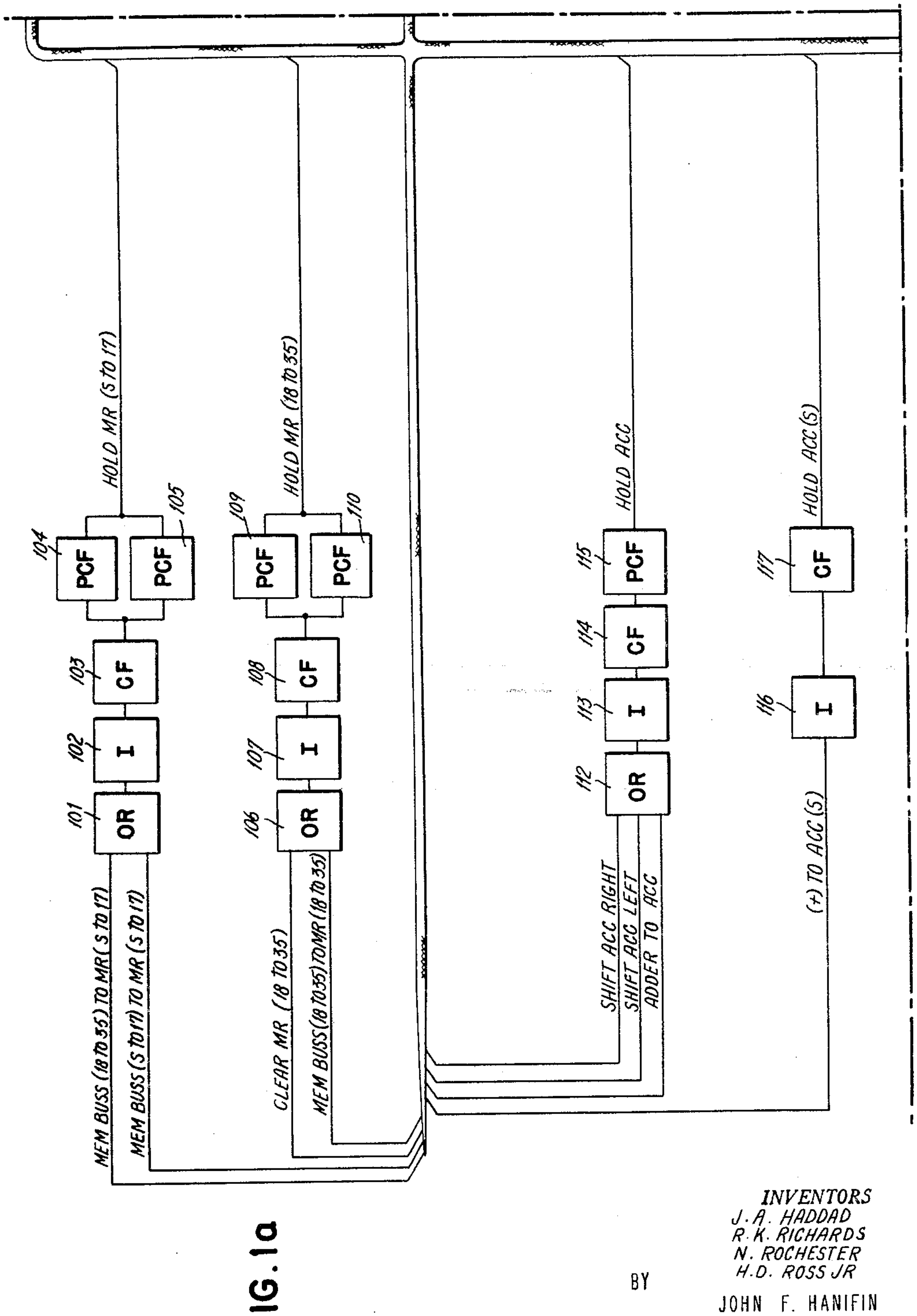
Figure 1B:
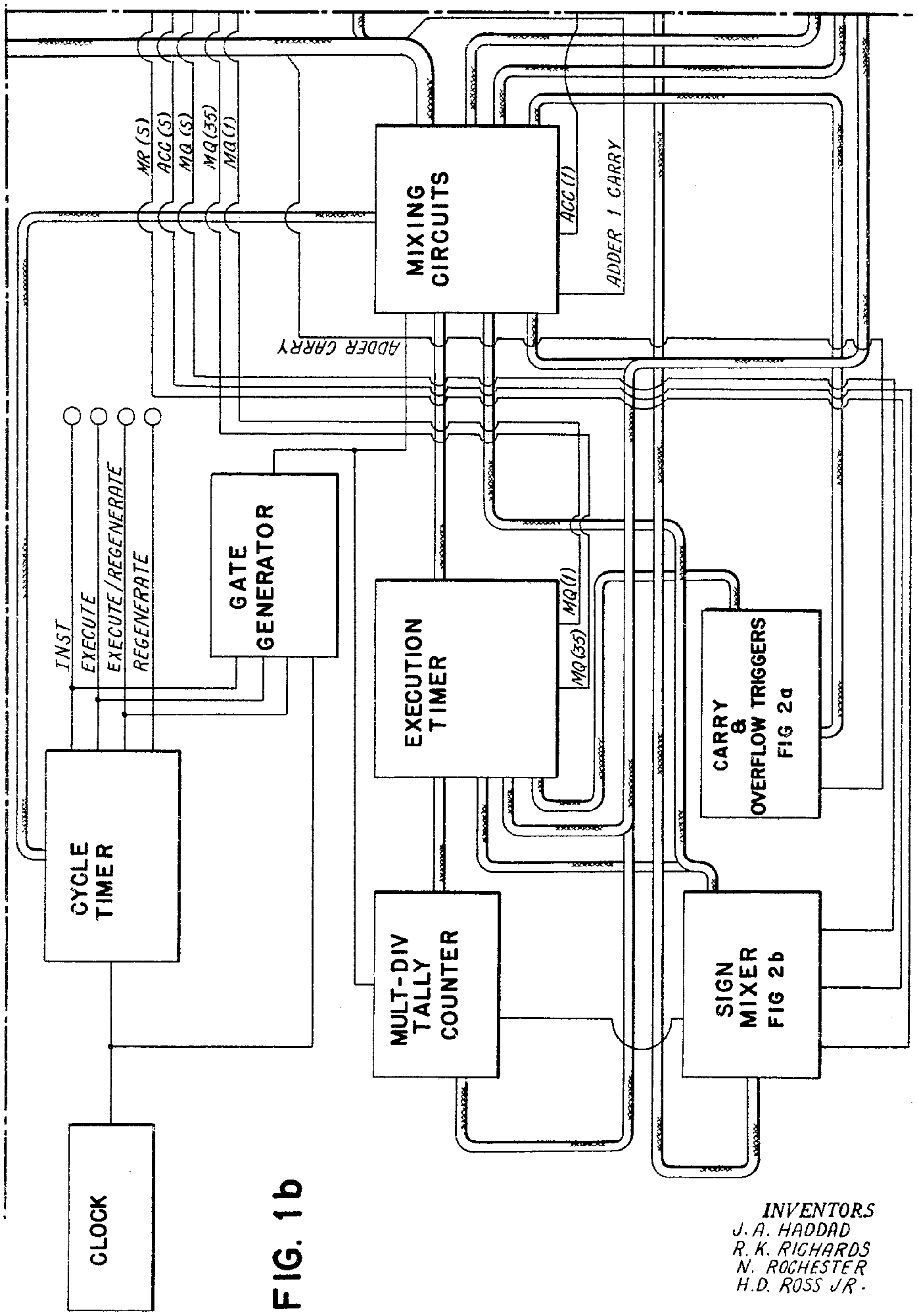

The present invention relates to a Calculator for performing binary calculations on data; derived from the cathode ray tube storage elements comprising the Memory of an Electronic Data Processing Machine. This application is a division of an application of J. A. Haddad et al., Serial No. 419,642, filed March 30, 1954, entitled "Electronic Data Processing Machine," now Patent No. 2,974,866, issued March 14, 1961.

As set forth below, in A BRIEF OUTLINE OF THE CALCULATOR, the Calculator, per se, is operated by a Program, stored in Memory, said Program including Instructions for initiating certain Arithmetical processes upon data, also stored in said Memory. The Calculator is of the parallel type comprising 35 orders and a Sign order and all 35 orders are handled, in parallel.

The Calculator, per se, comprises a 36 order Memory Register, comprising 35 orders and a Sign order; a 35 order Adder, each comprising a full binary adder, of logical AND and OR circuits and additional circuitry and two overflow orders, each comprising half binary adders of logical AND and OR circuits and additional circuitry; an Accumulator Register, of 35 orders, for storing data, two overflow orders and a Sign order, each comprising a Delay Unit, as the storing element, per se, of each order, which Unit, as described below, has the inherent faculty of emitting an output indication, of a previously stored bit, as a new bit is simultaneously applied to the input of said Unit. Another register called the Multiplier Quotient Register (MQ) comprising 35 orders and a Sign order also utilizes a Delay Unit, as the storage element, per se. The 35th order of the Accumulator Register is connective to the Multiplier Quotient 1 order and vice versa, whereby the MQ and the Accumulator Register are shiftable, as a unit, any desired number of steps, either to the right or to the left. As pointed out below, the logical nature of the Adder and the unique characteristic of simultaneous input and output of the Delay Units, along with the fact that the outputs of the Accumulator Register Delay Units are respectively connected to inputs of the Adder orders, and operable to deliver True or Complement representations of the respective values, stored in said Accumulator Register, while outputs of the respective Adder orders are respectively connected to the inputs of the Delay Units of the Accumulator Register, provide a Calculator wherein carries ripple through almost instantaneously and due to the simultaneous input/output feature of the Delay Units, "tentative" arithmetical operations can be performed and can also be completed or not completed, selectively, in accordance with operating conditions, whereby extremely rapid calculations are produced, at speeds heretofore unheard of, and limited only by the operating speeds of the circuit components, per se.

Further, Sign indicating and checking devices are provided whereby the Calculations may be performed in accordance with the Signs and including special operations particularly involving Signs, and the results of said Calculations are stored, with the proper Sign indications.

Means are provided, as stated above, to read Instructions from Memory and control data handling in accordance with these Instructions, both data and the Instructions being stored in Memory, at selectable Addresses. As described below, Instructions comprise half words of 18 bits, including Sign, read from Memory to the Memory Busses and via the Memory Busses to a Memory Register, hereinafter referred to as the MR and from the MR to an Instruction Register having a Sign storage portion, an Operation storage portion and an Address storage portion, which latter is also operative, as a Count Down Counter, to count the number of certain steps, during for example, MULTIPLY, DIVIDE or SHIFT operations. The Instruction Register stores binary 1 and binary zero manifestations, the permutations thereof stored in said Operation portion being DE-CODED by an Operation Decoder which, in turn, controls various Control Circuits including Execution Timers and Mixing Circuits, all as described below, whereby each of the Instructions, so decoded, is respectively carried out.

When data comprising full or half words are read from Memory to the MR, it may be read to the Adder and thus to the Accumulator Register.

Said Memory Register is also connective to said Multiplier Quotient Register, referred to hereinafter as the MQ to thus transfer data from Memory via the MR to said MQ. Such data, delivered to the MQ or to the Adder, as mentioned above, may comprise FULL or HALF words, a FULL word comprising two HALF words and consisting of 35 bits and the Sign bit, all as described below.

Overflow and Carry triggers are provided to indicate when an overflow occurs from the regular orders to the overflow orders of said Accumulator Register and to indicate carries, from the highest order of said Adder and also from the highest overflow order thereof. Various other circuits are provided, as described in detail below, to provide means whereby a large number of arithmetical and data handling operations can be performed under control of Instructions stored in said Memory, and Read out, therefrom, to said various circuits, including said Operation Decoder.

Among the Operations which are performed are STOP AND TRANSFER, TRANSFER, TRANSFER ON AND RESET OVERFLOW, TRANSFER ON ZERO, ADD, RESET AND ADD, ADD ABSOLUTE VALUE, SUBTRACT, RESET AND SUBTRACT, SUBTRACT ABSOLUTE VALUE, NO OPERATION, STORE, STORE ADDRESS, STORE NUMBER FROM MQ, LOAD MQ, MULTIPLY, ROUND, MULTIPLY AND ROUND, DIVIDE, LONG SHIFT LEFT, LONG SHIFT RIGHT, SHIFT ACCUMULATOR LEFT, and SHIFT ACCUMULATOR RIGHT.

One of the objects of the present invention, therefore, is to provide, means for carrying out, efficiently and at high speed, certain of these operations and particularly those pertaining to Arithmetical operations.

Another object is to provide novel means for injecting a binary 1 or a binary 0 selectively, into a Delay Unit, used as a storage element.

A further object is to provide, in a Delay Unit, a diode AND circuit, for recirculating a binary 1 manifestation stored therein, and means for deconditioning one input to said AND circuit, whereby the manifestation, stored in said Delay Unit, becomes a binary 0 manifestation.

Another object is to provide in a Delay Unit combination having an object, as above, means including a diode OR circuit, for recirculating a binary 1 manifestation passed by said AND circuit during recirculation of a binary 1, and means for directly applying a binary 1 manifestation, to said OR circuit, regardless of the binary 1 or binary 0 character of the manifestation stored in said Delay Unit, whereby a binary 1, is directly injected into said Delay Unit, for manifestation therein, without altering the inputs to said AND circuit.

A further main object is to provide, in combination, a plurality of storage elements comprising plural order storage means, respectively, storing a plurality of binary 1 or binary 0 bit representations, selectively, a storage element for storing a manifestation of a Sign, means for shifting the respective representations in said plurality of storage elements, a desired number of steps, in either one of two desired directions, and means, excluding said Sign order, from said shifting operation, whereby the contents of said respective storage elements may be altered but the Sign manifestation remains unaltered.

Another object is to provide a device having an object, as above, and including an Overflow trigger, and means for flipping said Overflow trigger, when a binary bit representation is shifted, in one chosen direction, out of the highest order of said plural order storage means.

Still another object is to provide a device having an object, as above, and including a plurality of Overflow orders, and said triger being flipped, when a bit representation is shifted to said Overflow orders, in said one direction, but is not flipped, when a bit representation is shifted out of said Overflow orders to said highest order of said plural order storage means.

Another object is to provide a device having a main object, as above, and including a second plural order storage means, including a Sign order and a plurality of value orders, means connecting the lowest value order, of said first plural order storage device, to the highest value order of said second storage device, and means effective to shift the contents of said lowest order to said highest order, in one direction of shift, and the contents of said highest order, to said lowest order, in the other direction of shift, whereby both said storage devices operate as a single device during said shifting.

A further object is to provide a device having an object, as above, and means, excluding, both said Sign orders from said shifting process, in either direction.

Another object is to provide a device having an object, as next above, and including, means setting the Sign order of said first storage means to the Sign of said second storage means, upon shifting from the second to the first, and means, setting the Sign of said second storage means to the Sign of said first storage means, upon shifting from the first storage means to said second storage means.

Other objects of the invention will be pointed out in the following description and claims and illustrated in the accompanying drawings, which disclose by way of example, the principle of the invention and the best mode which has been contemplated of applying that principle.

Figure 1C:
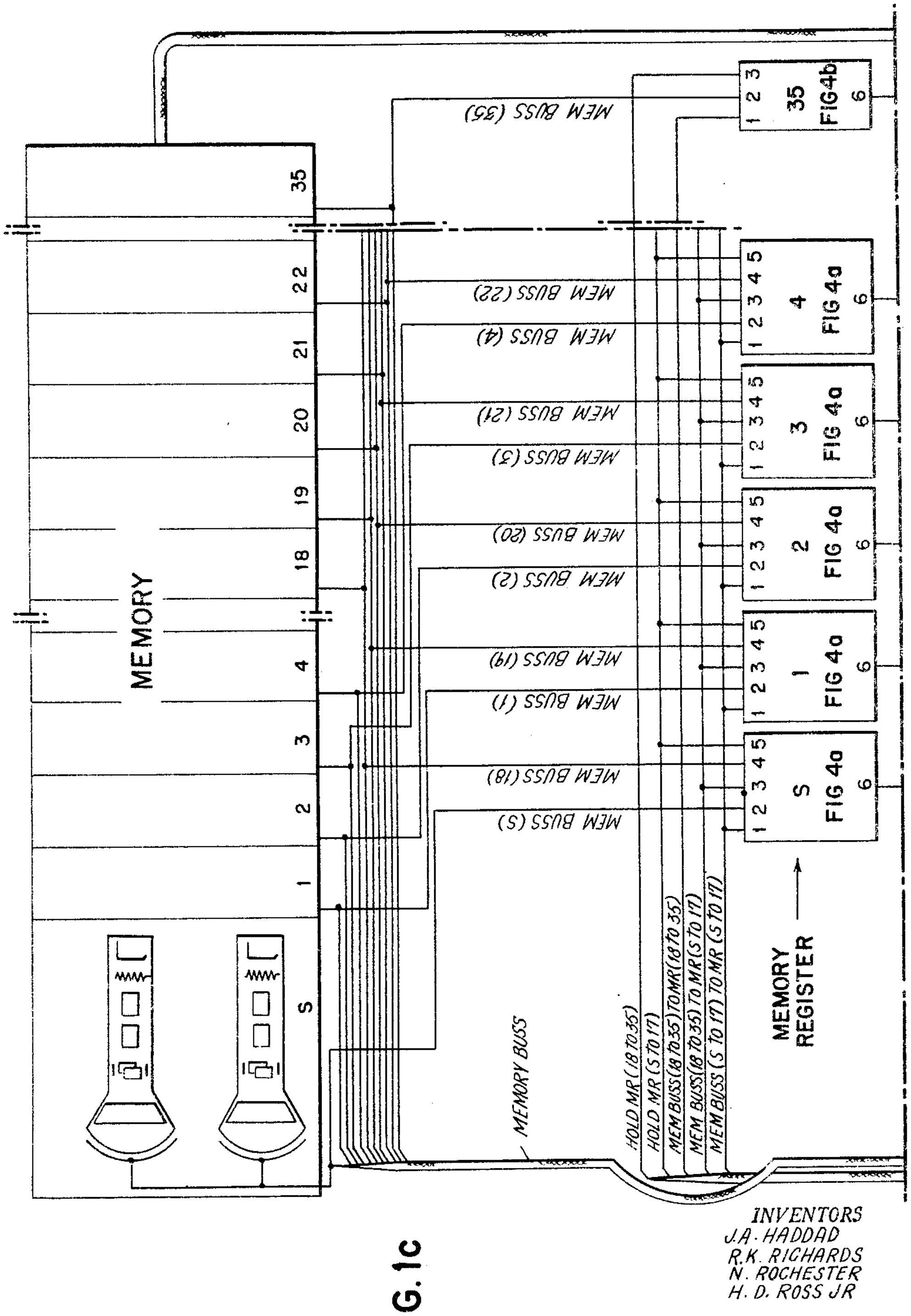
Figure 1D:
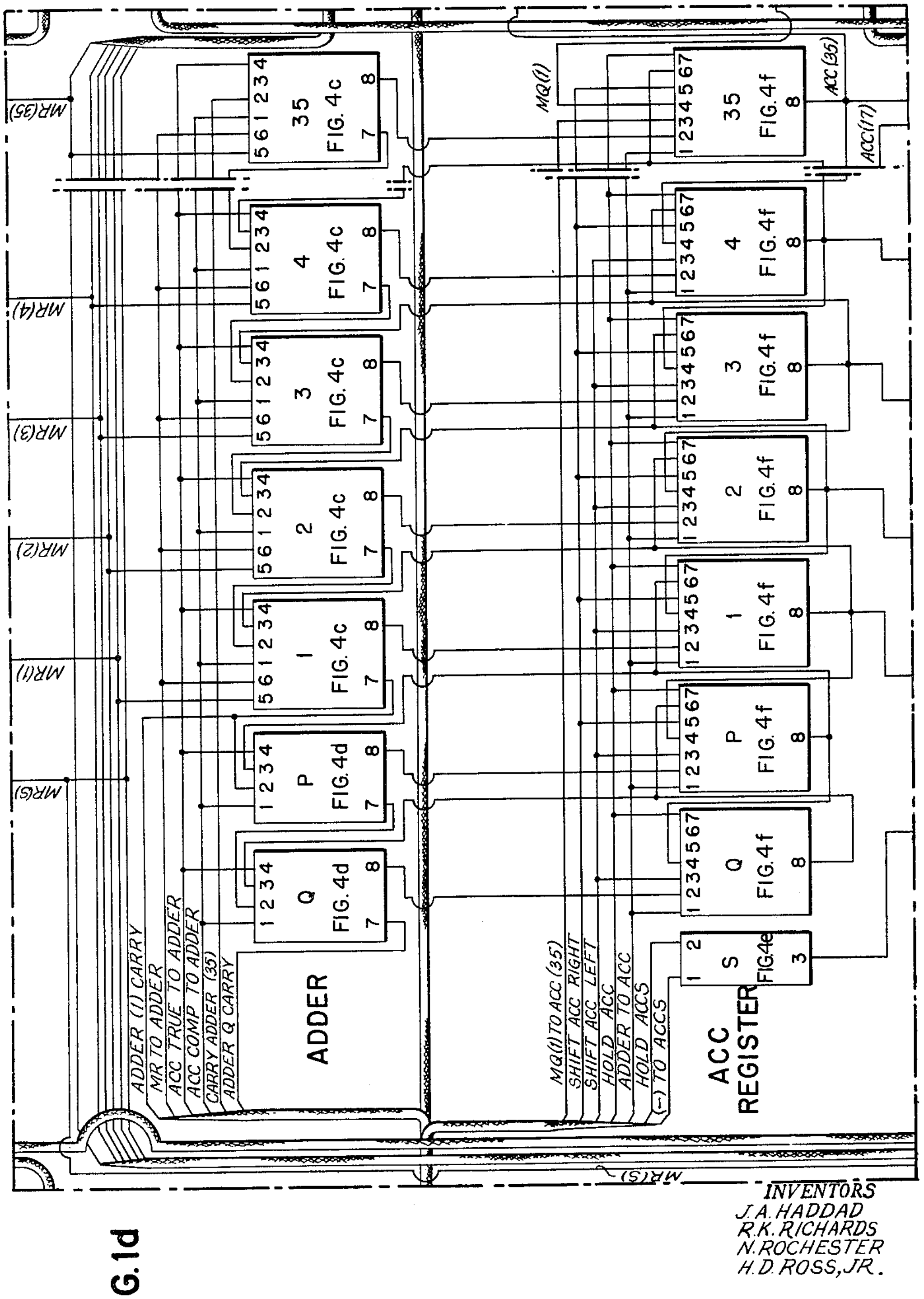
Figure 1E:
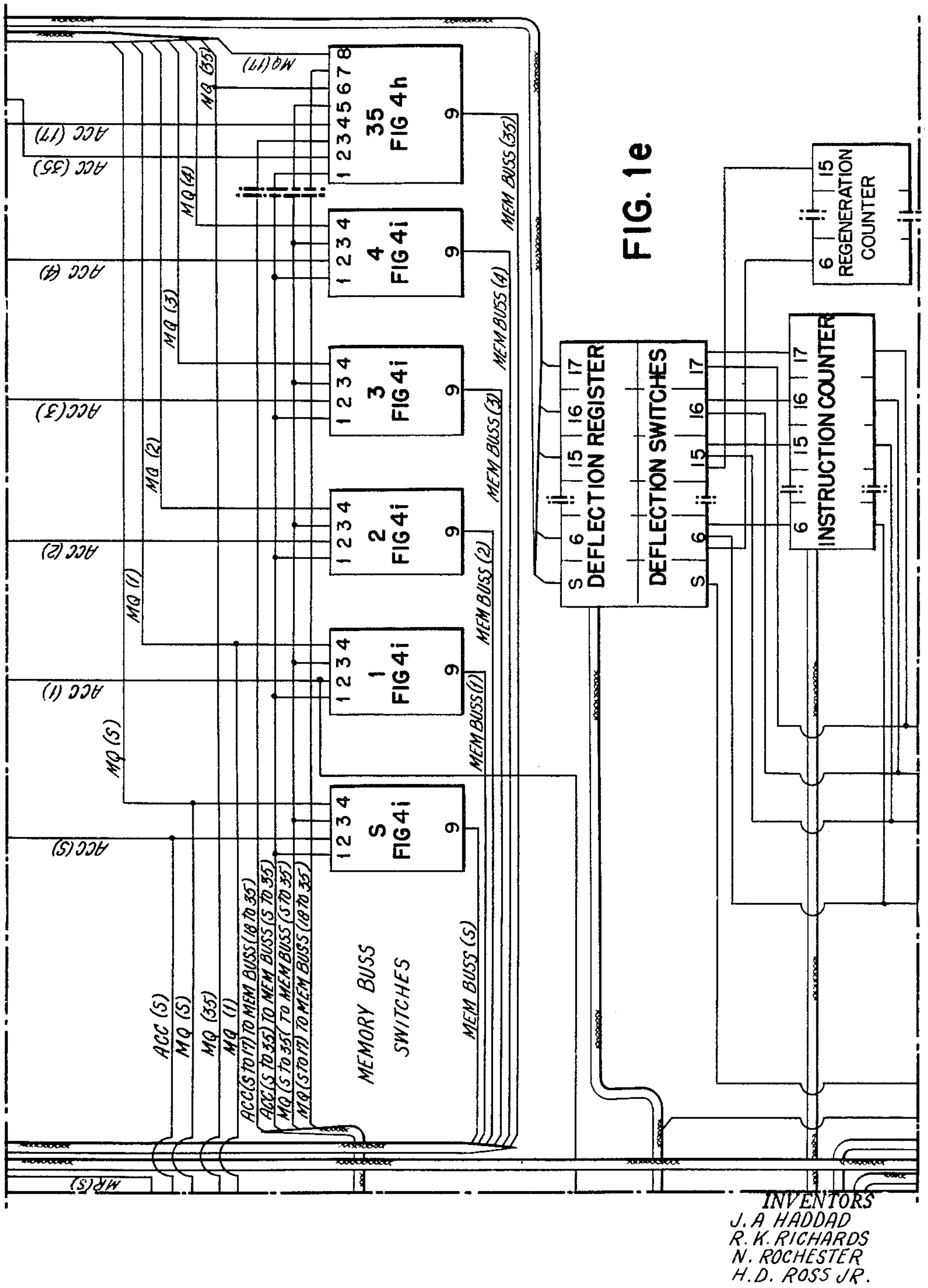
Figures 1F, 1H:
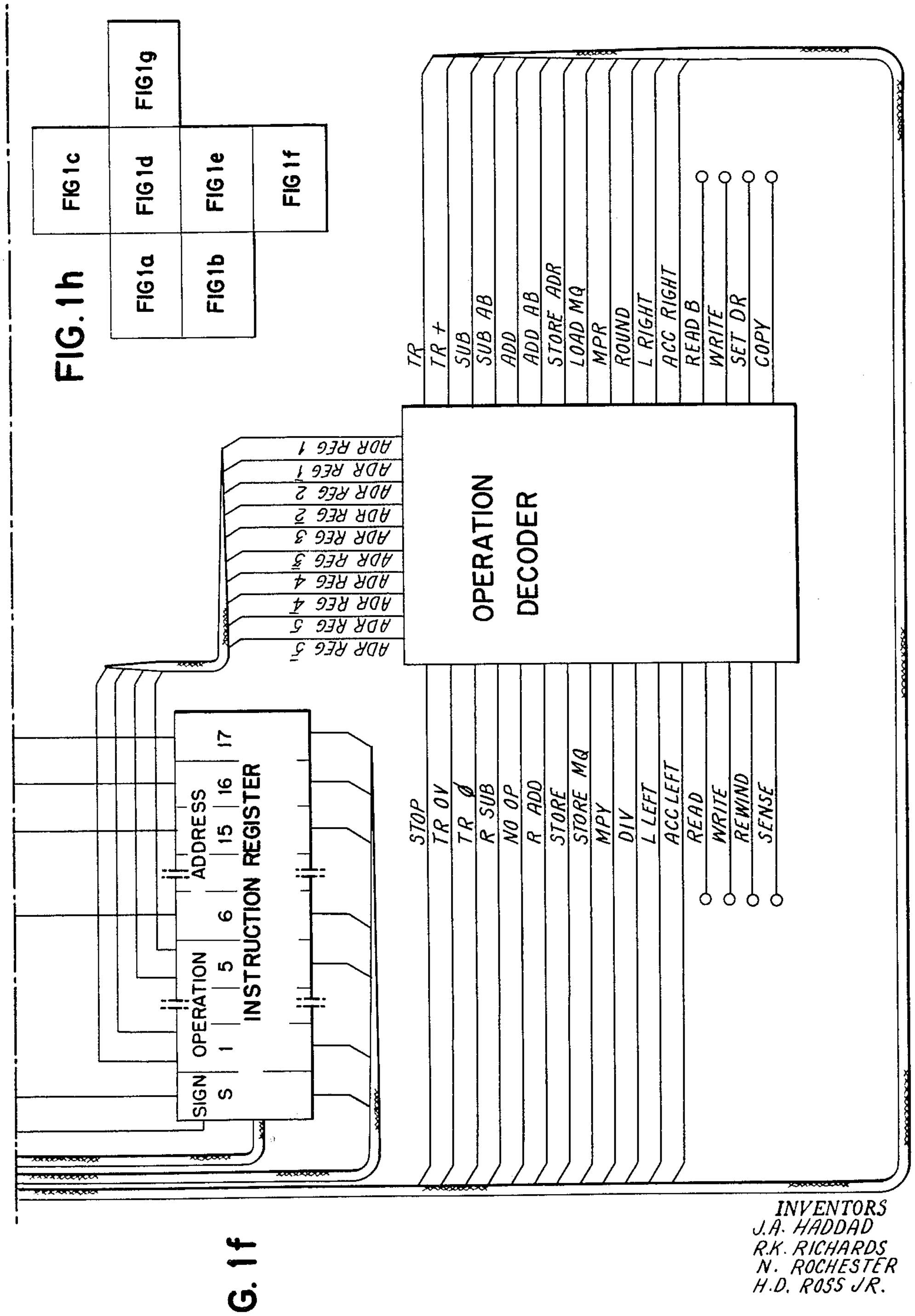

In the drawings:

FIGS. 1*a*, 1*b*, 1*c*, 1*d*, 1*e*, 1*f* and 1*g* taken together, as shown in FIG. 1*h*, comprise an overall block diagram of the Calculator.

Figure 2A:
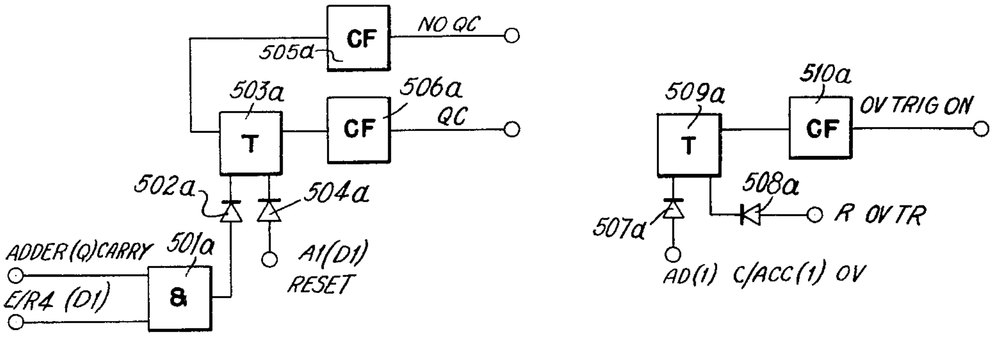

FIG. 2*a* is a block diagram of the Carry and Overflow trigger circuits.

Figure 2B:
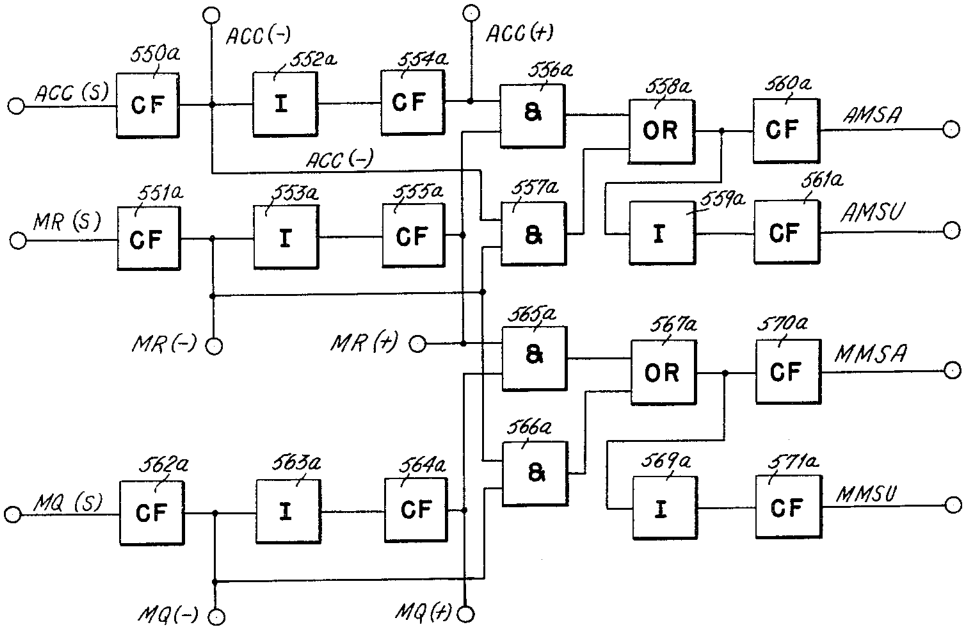

FIG. 2*b* is a block diagram of the Sign and Mixer Circuit.

Figure 3A:
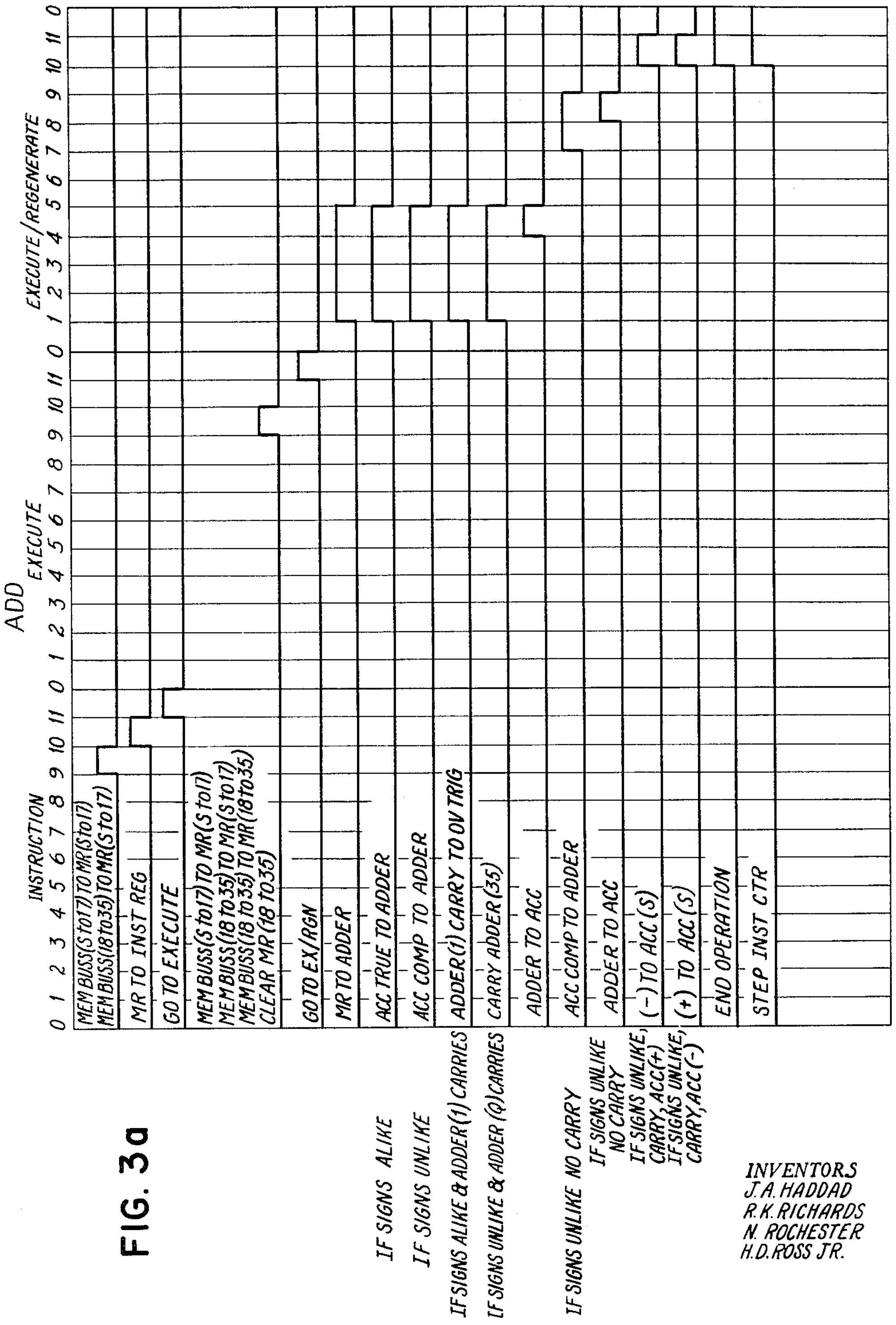
Figure 3B:
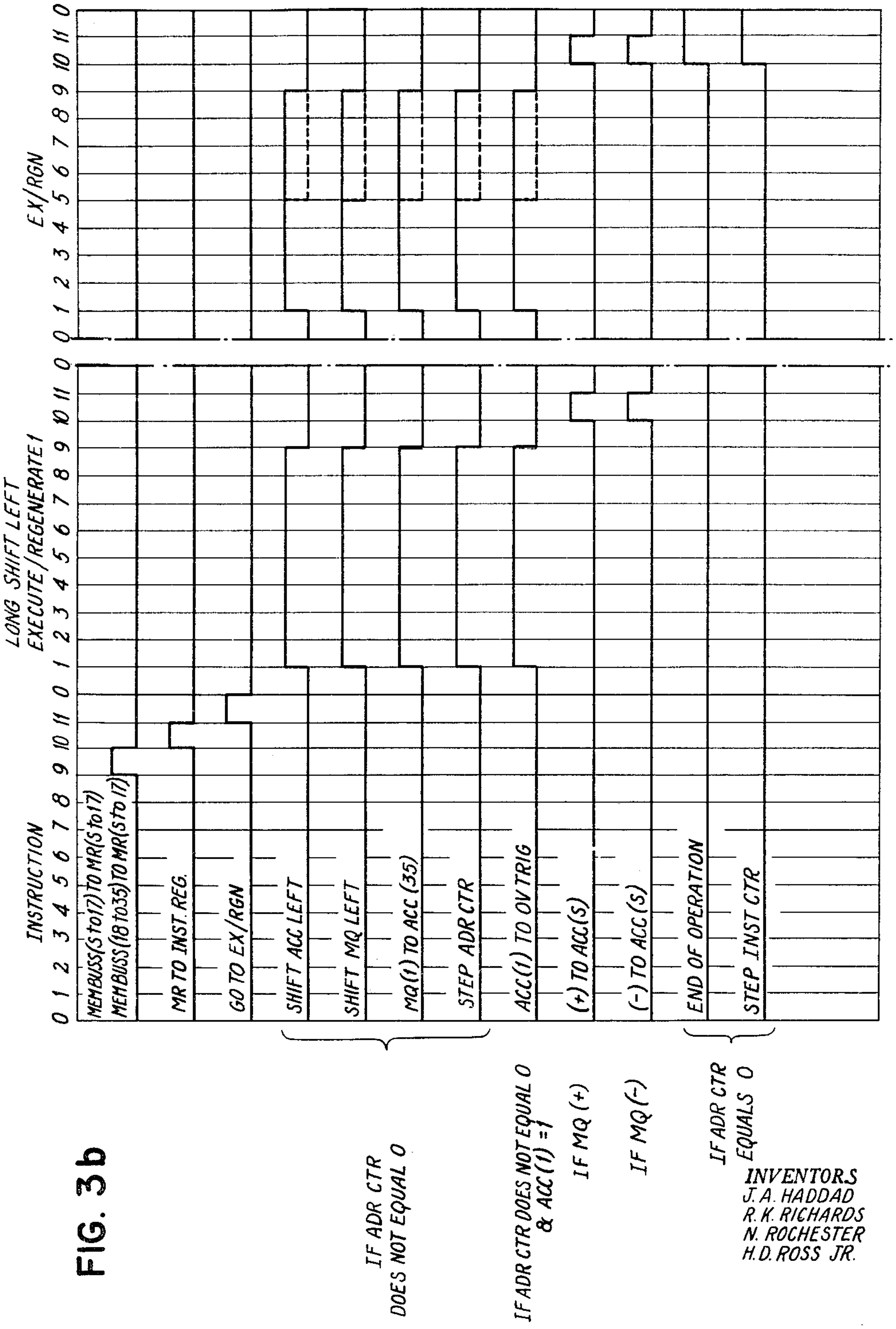

FIG. 3*b* comprises a Timing Diagram for LONG SHIFT LEFT operation.

Figure 3C:
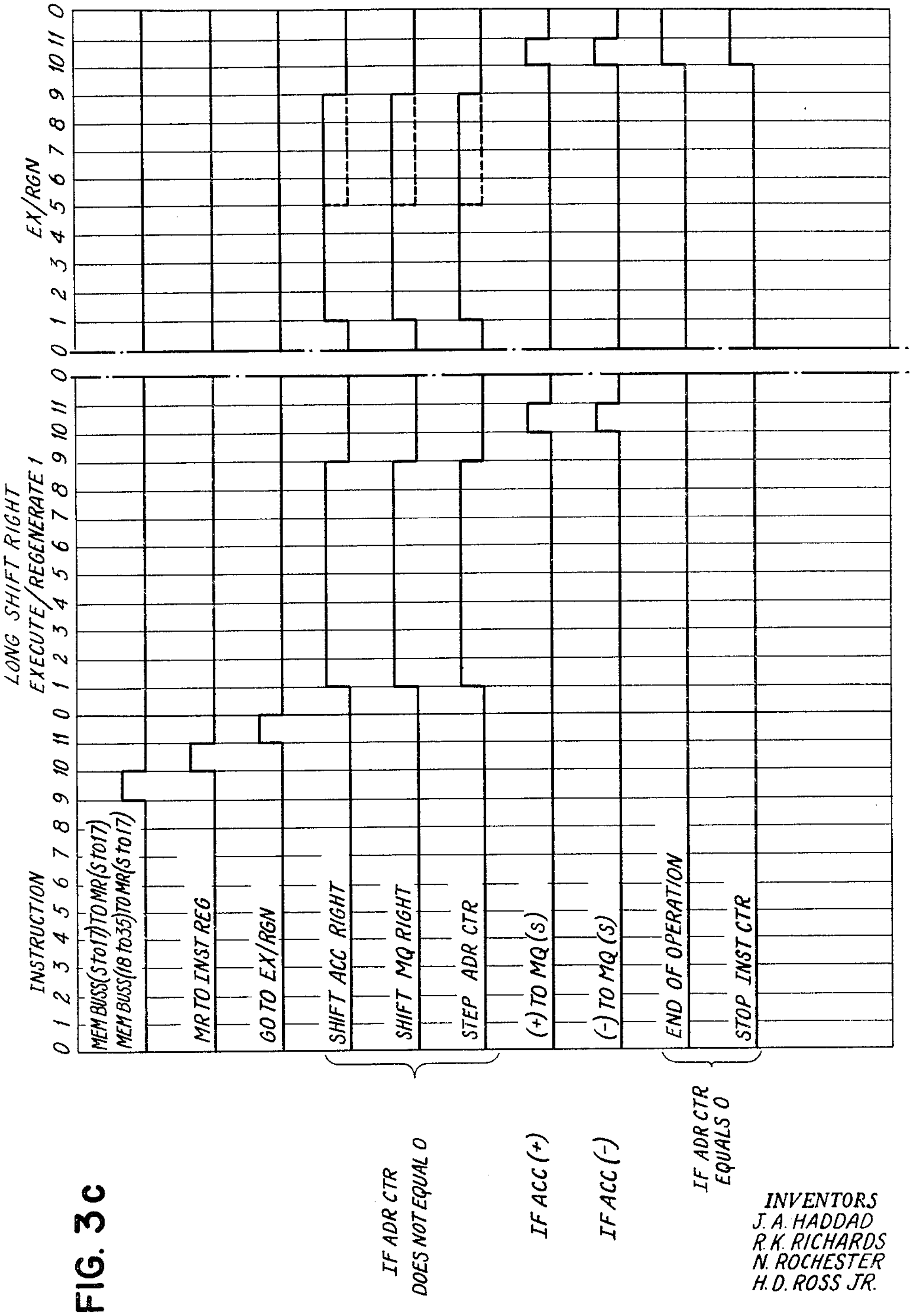

FIG. 3*c* comprises a Timing Diagram for a LONG SHIFT RIGHT operation.

Figure 3D:
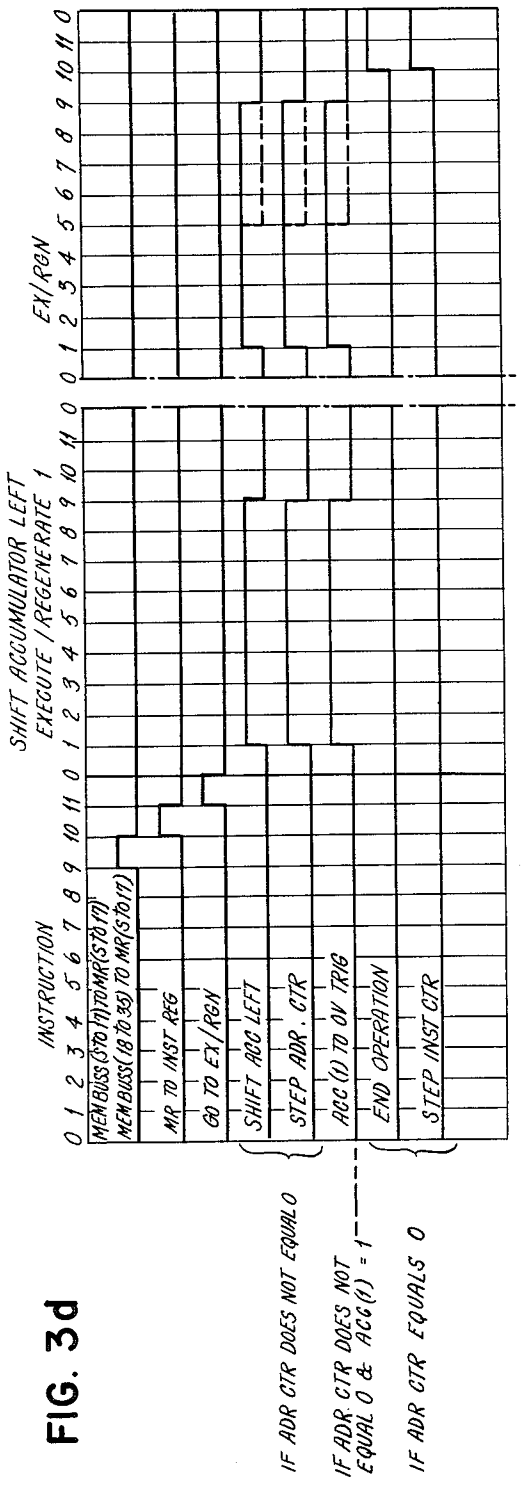

FIG. 3*d* comprises a Timing Diagram for a SHIFT ACCUMULATOR LEFT operation.

Figure 3E:
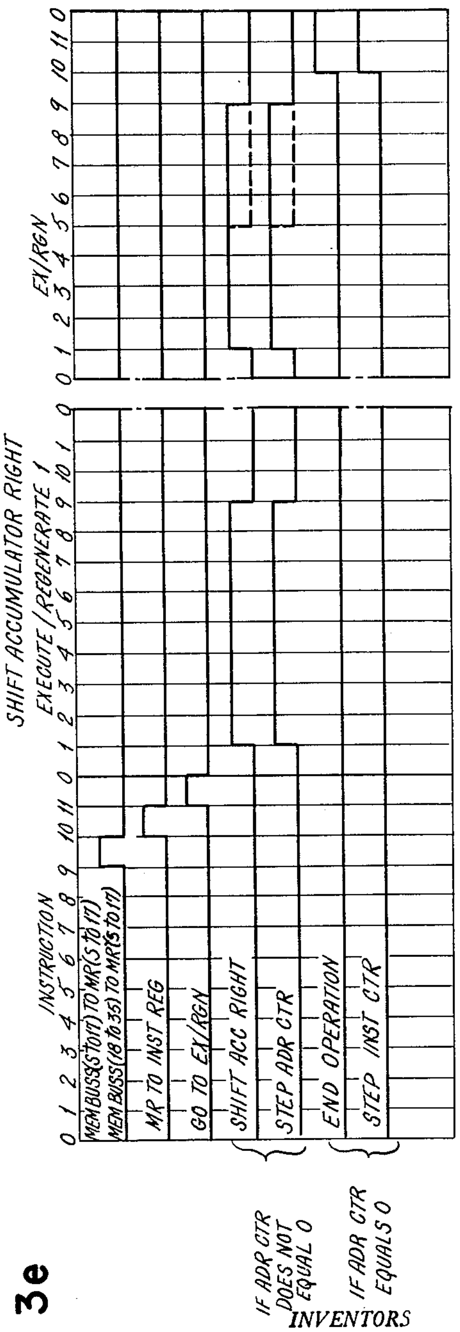

FIG. 3*e* comprises a Timing Diagram for a SHIFT ACCUMULATOR RIGHT operation.

Figure 3F:
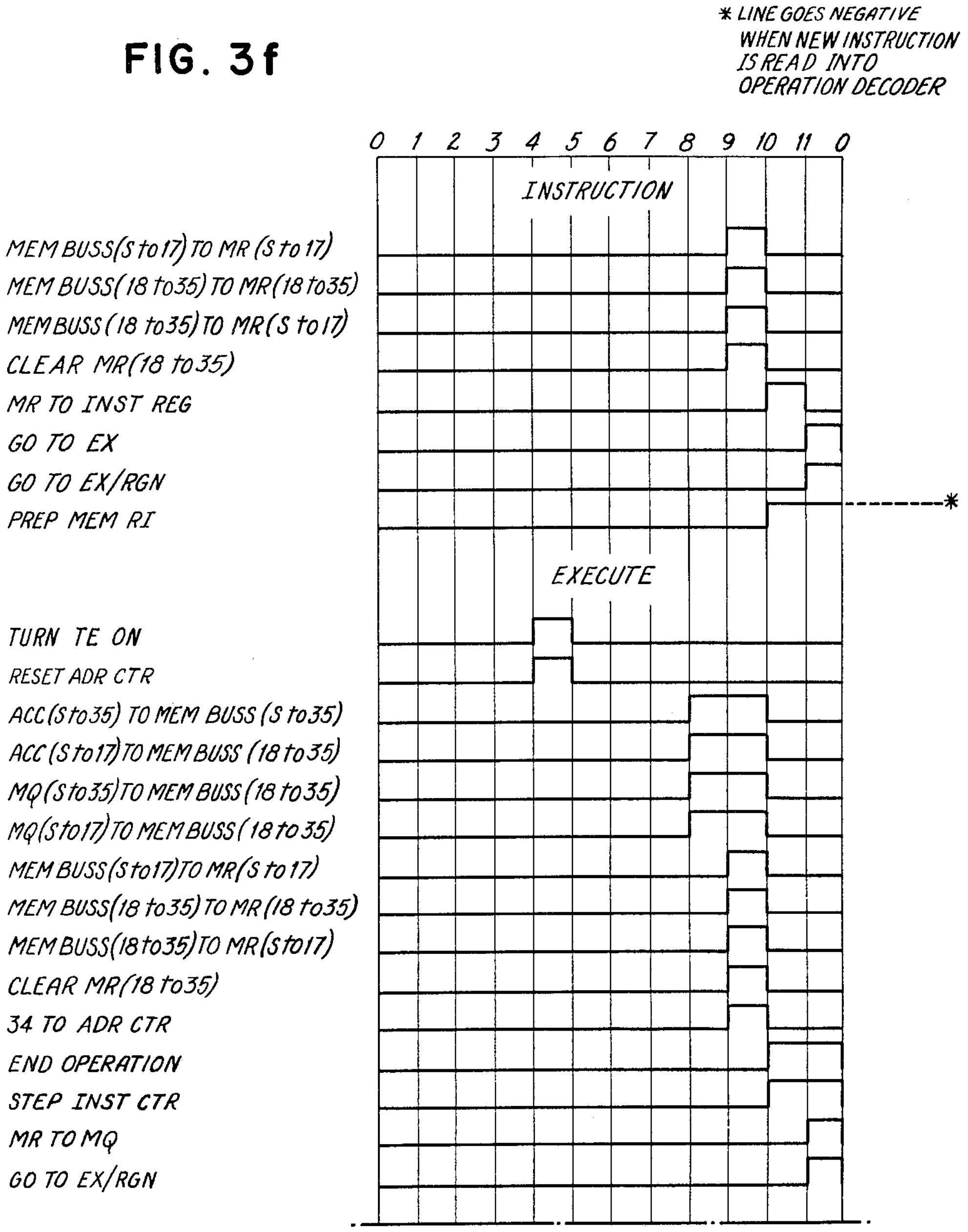
Figure 3G:
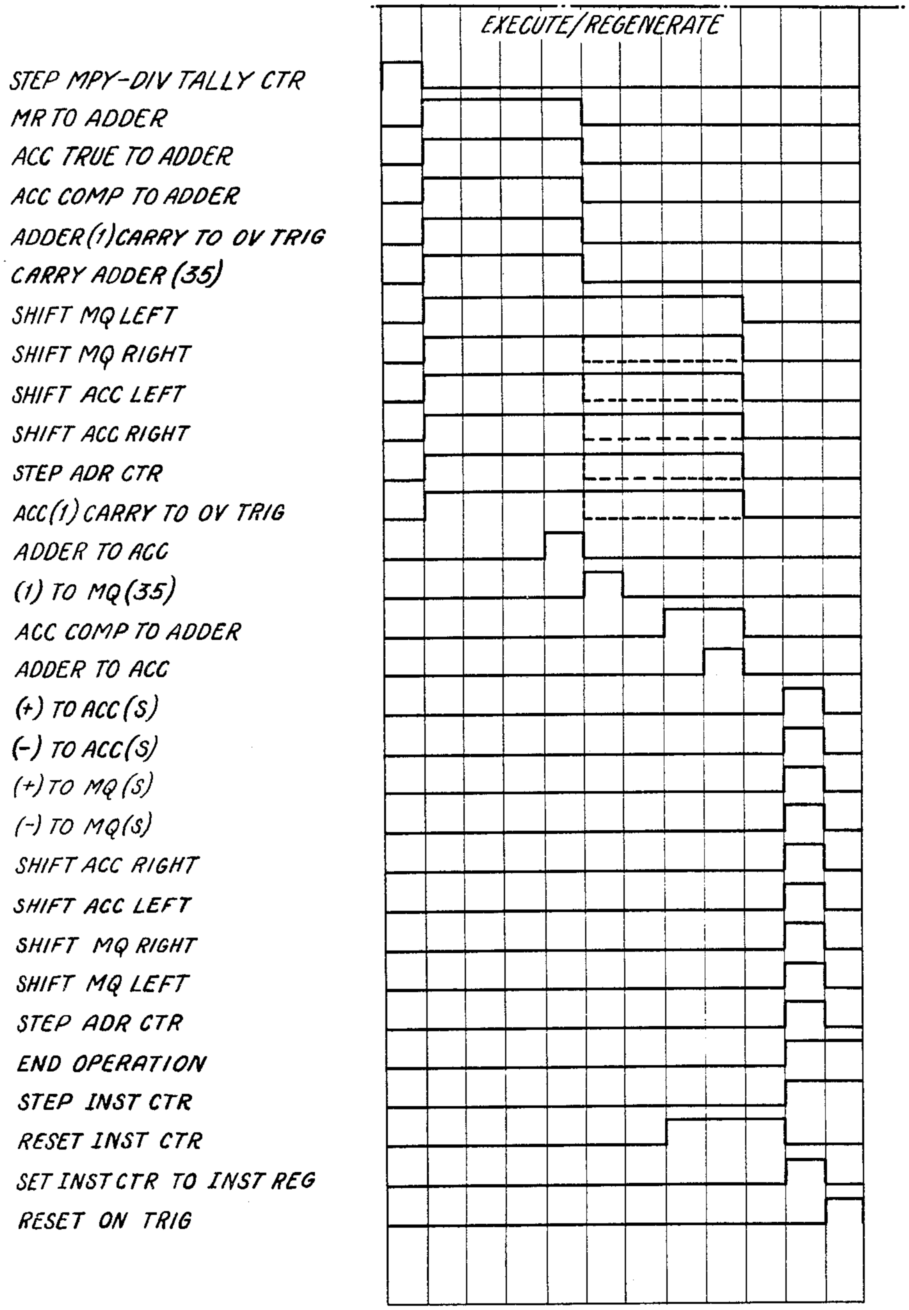

FIGS. 3*f* and 3*g*, taken together, with FIG. 3*f* located above FIG. 3*g*, comprise Timing Diagram showing all signals developed during various types of character cycles.

Figure 4A:
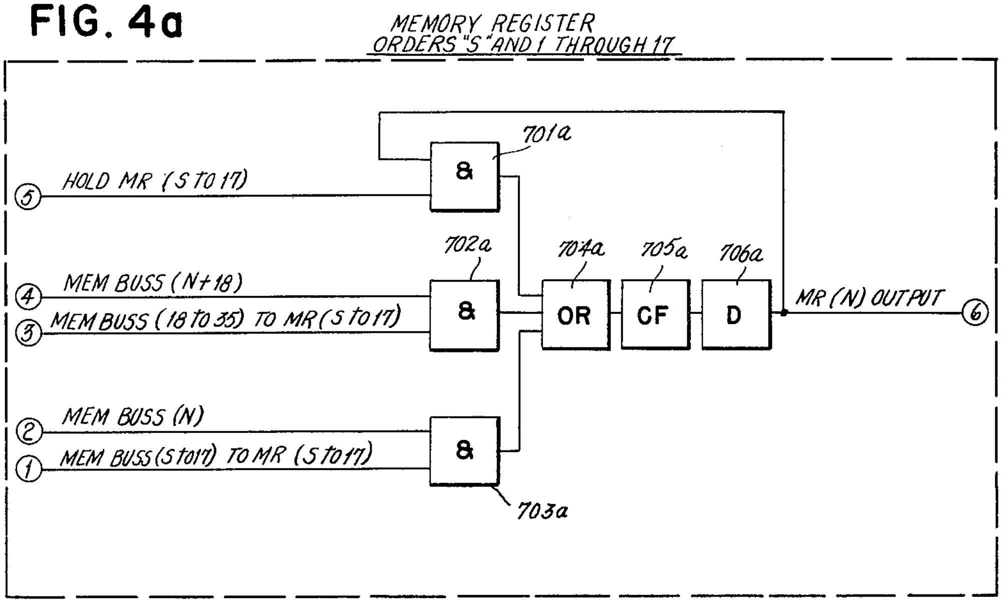

FIG. 4*a* is a block diagram of a Memory Register order, used in Memory Register orders S and 1 through 17.

Figure 4B:
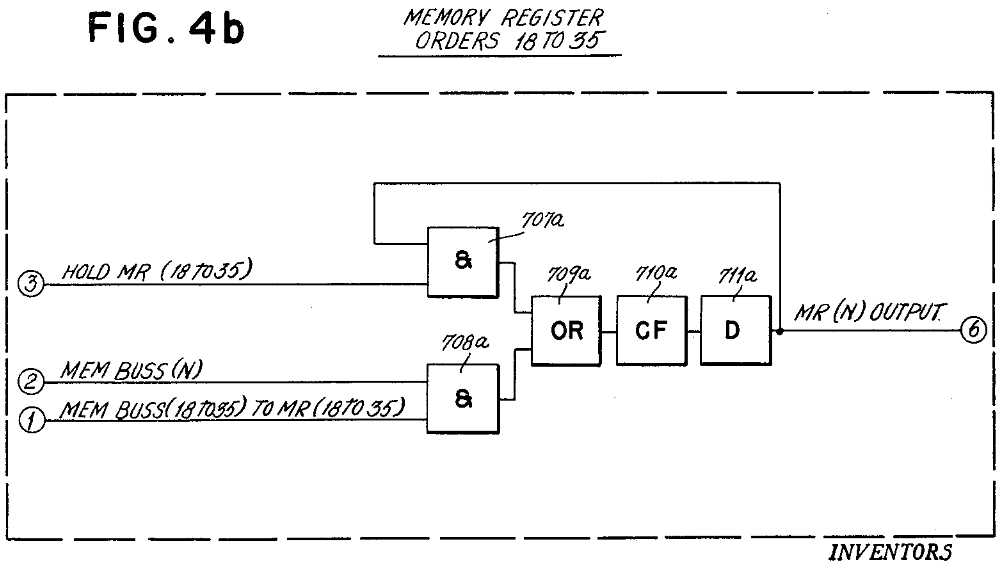

FIG. 4*b* is a block diagram of a Memory Register order, representing circuits used in Memory Register orders 18 through 35.

Figure 4C:
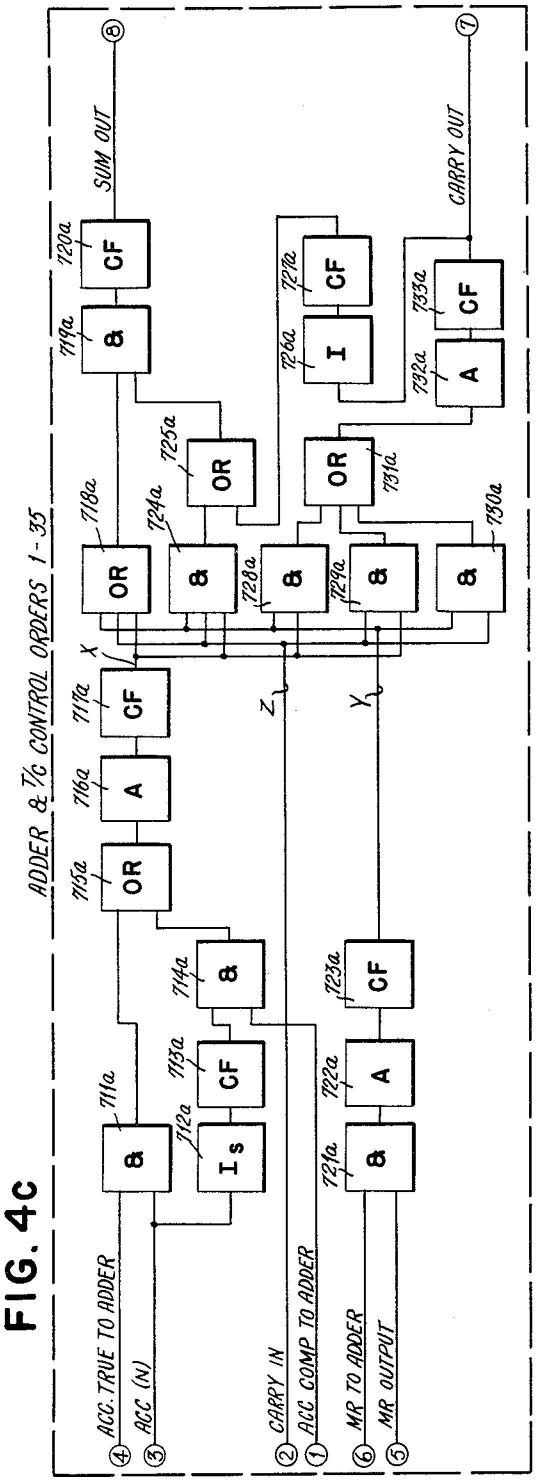

FIG. 4*c* comprises a full adder and true complement controls representative of the adder circuitry for Adders orders 1 through 35.

Figure 4D:
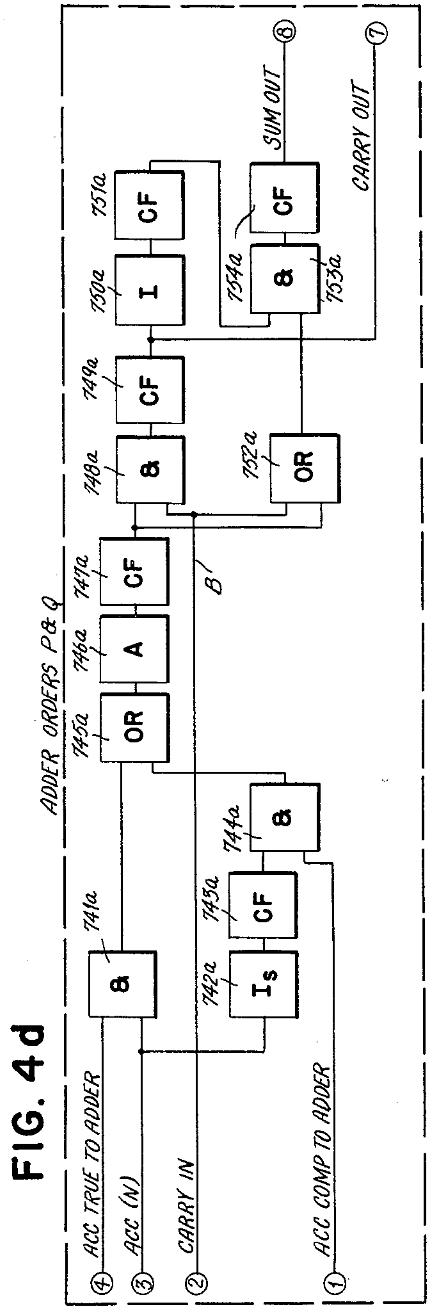

FIG. 4*d* comprises a block diagram of a half adder and true complement controls representative of the Adder orders P and Q.

Figure 4E:
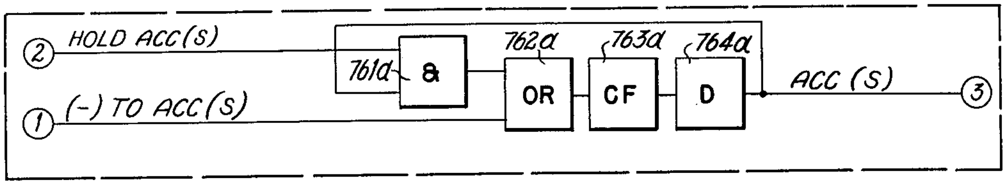

FIG. 4*e* comprises a block diagram of the Sign order of the Accumulator Register.

Figure 4F:
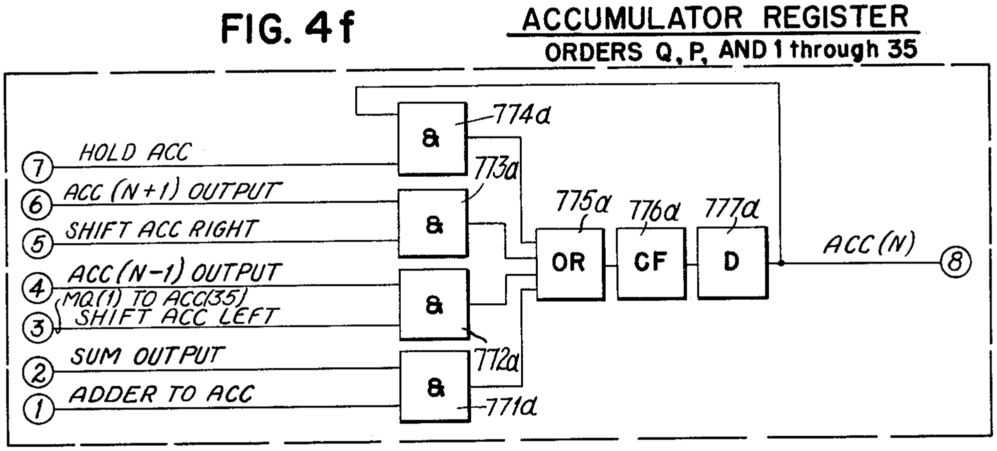

FIG. 4*f* comprises a block diagram of an Accumulator Register order, representative of orders Q, P and 1 through 35.

Figure 4G:
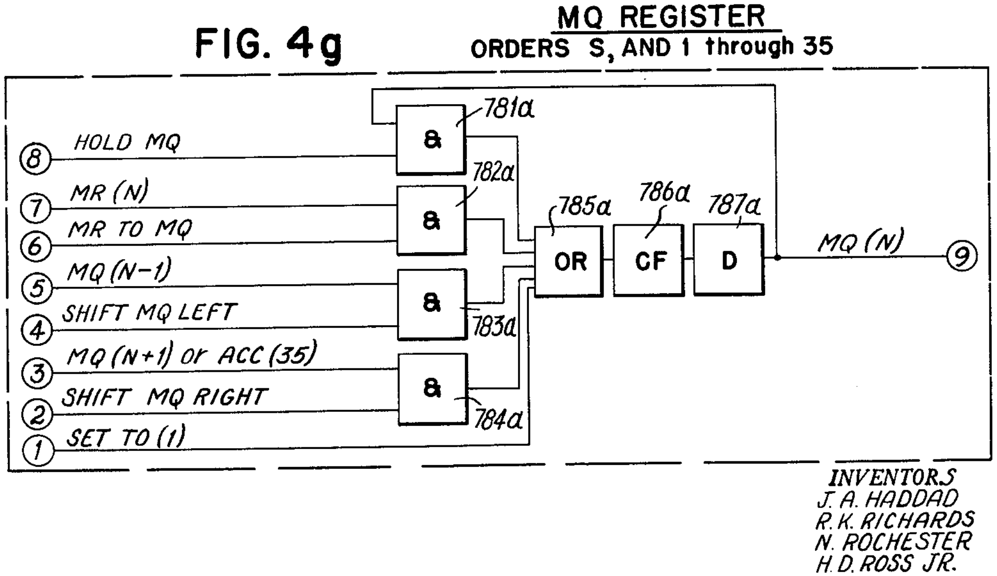

FIG. 4*g* comprises a block diagram of an MQ Register order, representative of orders S and 1 through 35.

Figure 4H:
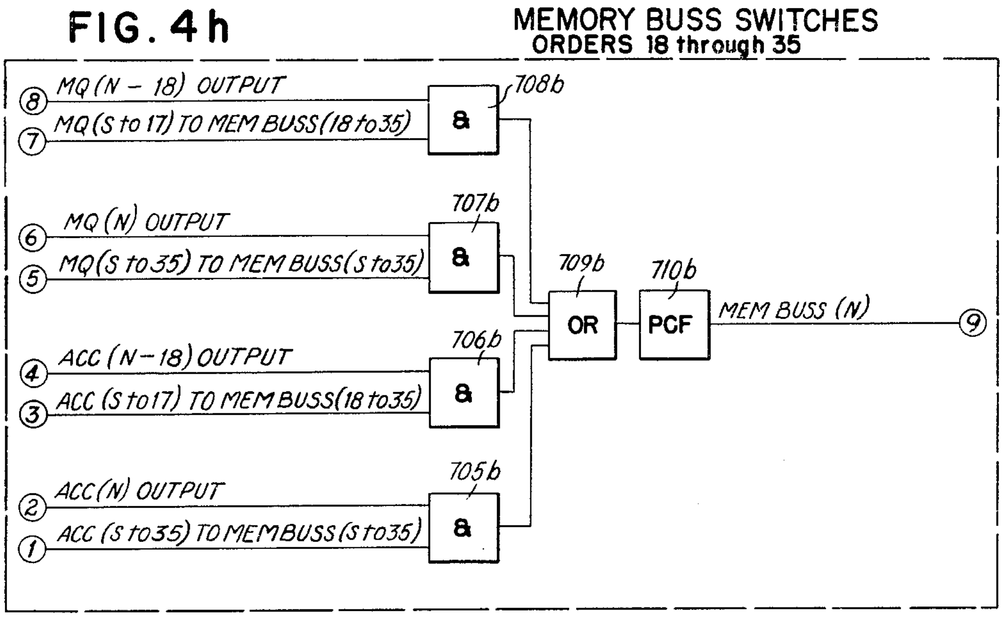

FIG. 4*h* comprises a block diagram of Memory Buss Switch circuits for Memory Buss orders 18 through 35.

Figure 4I:
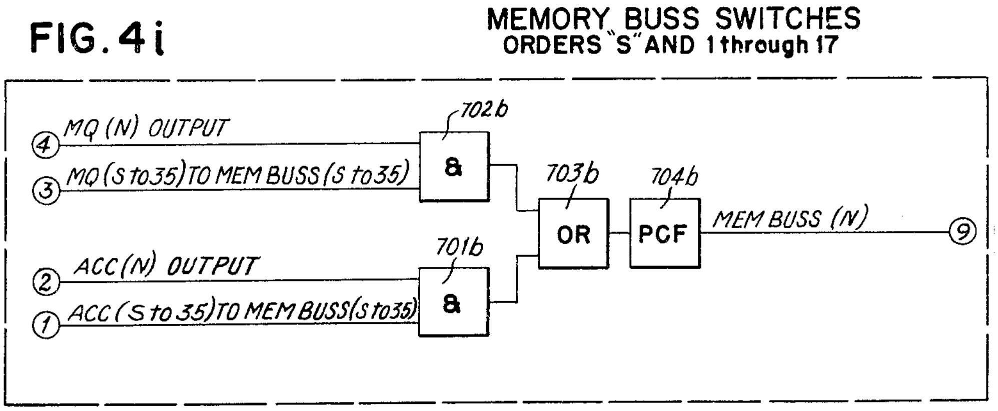

FIG. 4*i* comprises a block diagram of Memory Buss Switches, representative of orders S and 1 through 17.

Figure 5C:
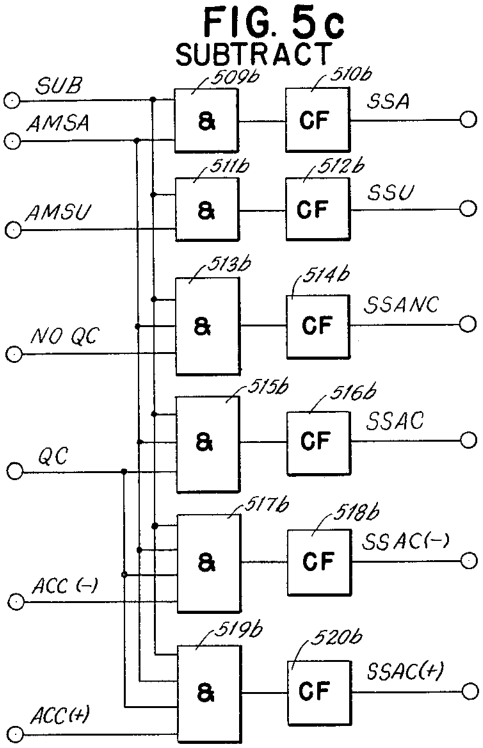

FIG. 5*c* is a block diagram of the SUBTRACT Execution Times.

Figure 5I:
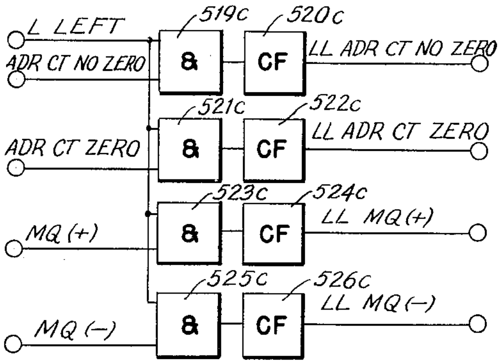
Figure 5A:
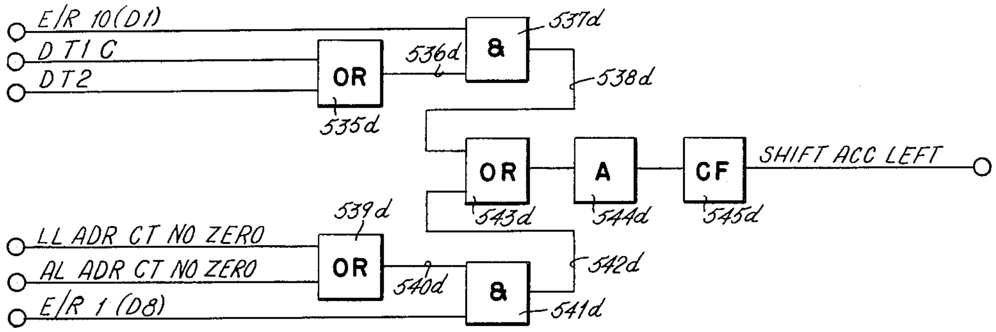
Figure 5B:
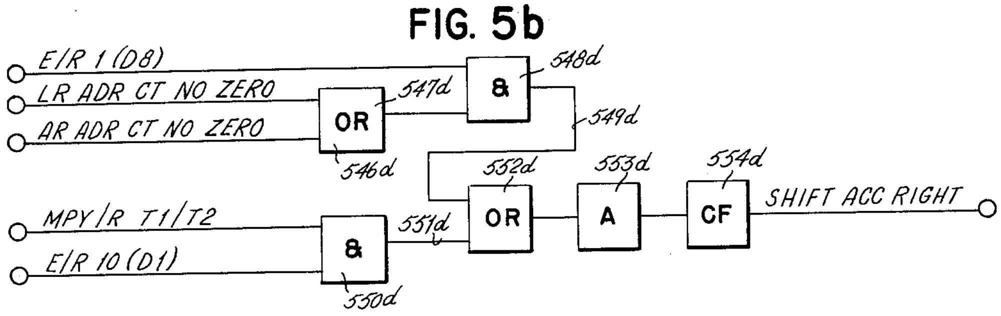
Figure 5D:
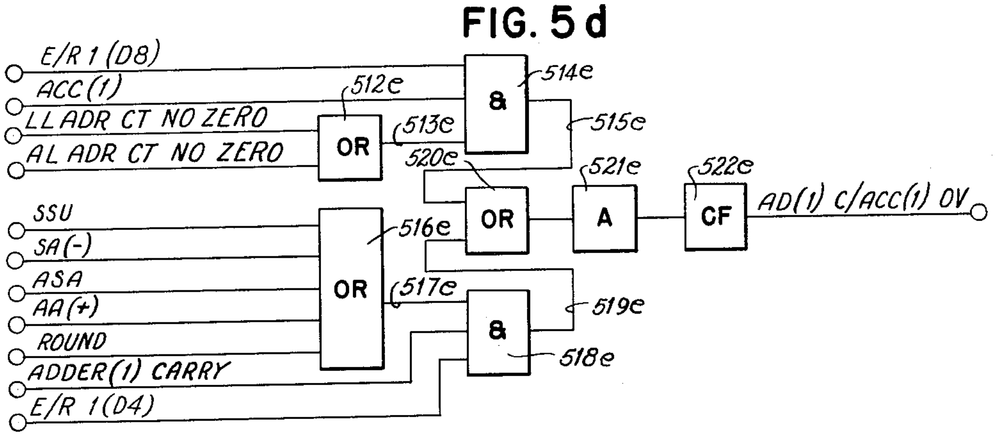
Figure 5F:
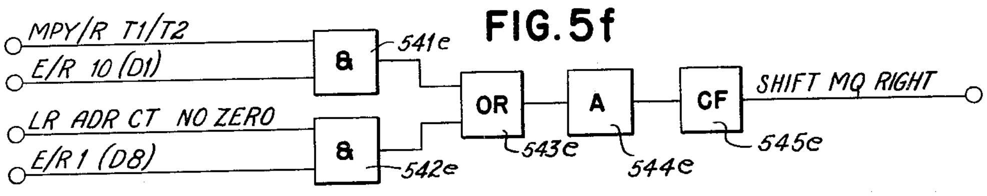
Figure 5G:
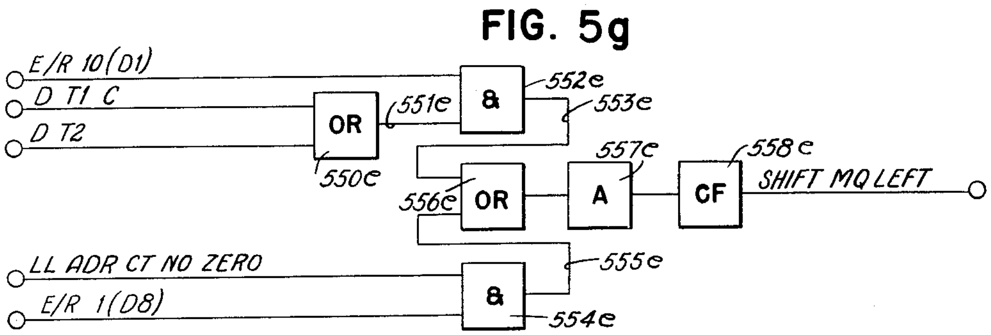
Figure 5E:
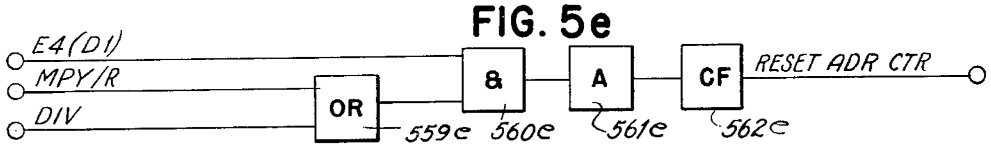
Figure 5H:
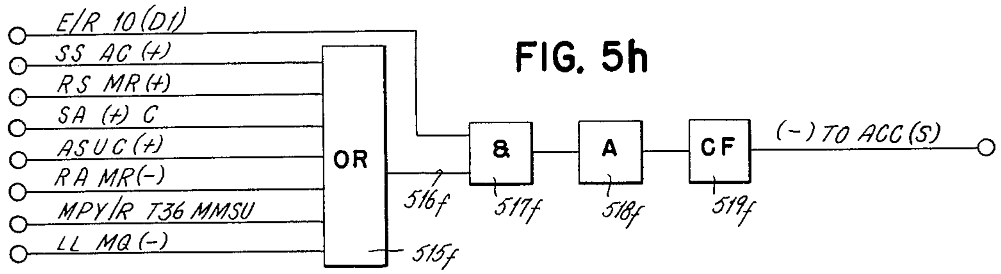
Figure 5J:
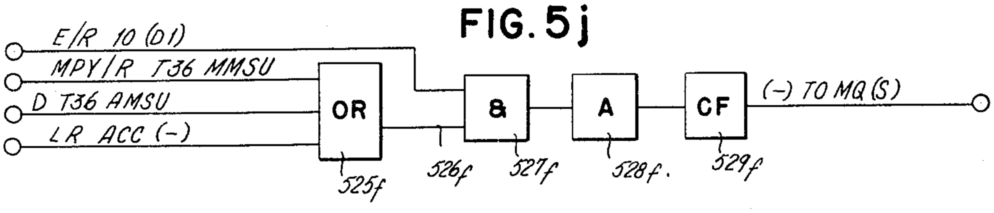

FIG. 5*i* is a block diagram of the LONG SHIFT LEFT Execution Times.

FIGS. 5*a*, 5*b*, 5*e*, 5*f* 5*g*, 5*h* and 5*j* comprise block diagrams of Mixing Circuits.

A BRIEF OUTLINE OF THE CALCULATOR

FIGS. 1*a* through 1*g*, taken together, and arranged as shown in FIG. 1*h*, comprise an overall block diagram of an Electronic Data Processing Machine including the novel Arithmetic Unit and showing, in general, the relationship of the various Units which make up the Calculator described in detail in the above-mentioned Haddad et al. patent, of which this is a division. The Memory Unit as used in the machine and as illustrated by a labeled block, in FIG. 1*c*, comprises cathode ray tubes used as electrostatic data storage means which have a maximum capacity 2,048 full words of storage (36 bits per word). These 2,048 full words, are stored, on 36 sets, of cathode ray tubes and since any full word may be split into two half words, the total number of half words, which can be stored, is 4,096. The number of cathode ray tubes provided, is chosen at 36, since in this Calculator a full word is 36 bits, so that with 36 sets of cathode ray tubes, 36 bits may be read out of the Memory Unit simultaneously or 36 may be stored, in the Memory Unit, simultaneously, during one cycle of operation. This simultaneous operation is referred to as parallel operation. The Memory Unit, employed herein is shown, described and claimed in the copending application of Philip E. Fox, et al., Serial No. 417,702, filed March 22, 1954, now Patent No. 2,950,465, issued August 23, 1960.

The timing of the Calculator is controlled by a Clock which comprises a twelve stage electronic trigger ring. The Clock develops 12 master timing pulses of one microsecond duration each, and a character cycle, of the Calculator, will be defined as one twelve microsecond period (one complete cycle of the Clock). The Clock is illustrated by the labeled block in FIG. 1*b*.

There are four general types of character cycles existing in the Machine operation. These four types of cycles are called Instruction, Execute, Execute/Regenerate, and Regenerate cycles, which are respectively abbreviated as I, E, E/R and R. The type of cycle at any certain time is controlled by a Cycle Timer, also illustrated by a labeled block in FIG. 1*b*.

As set forth in said above identified copending application of Fox et al., the electrostatic storage which comprises Memory for the Machine may be addressed, and the information, stored in Memory, at the respective addresses, may be read out to a Memory Register. All information leaving the Memory Units, enters this Memory Register which comprises 36 Delay Units, S, and 1 through 35, inclusive, each of the type as described below, along with associated switching circuits. The Memory Register designated hereinafter as MR, functions as a buffer storage between Memory and the Computer.

The 36 Delay Units of this MR provide storage for 36 bits read from Memory and hold these bits until they are called for by the Calculator. Information is read, out of Memory into the MR, in parallel fashion, that is, 36 bits are read, simultaneously, for a full word, or 18 bits, simultaneously, for a half word. If 36 bits are read they are read into all 36 Delay Units of MR but if a half word is read, they are always read into the Delay Units S, and 1 through 17 of the MR. Information thus read into the MR may not only be transferred to the Calculator but also via a Register of the Calculator, described presently, to other Units of the Machine. The Adder (FIG. 1*d*) represented by labeled blocks, comprises 37 columnar orders, two, of which, are overflow columns P and Q. Each of the columnar orders 1 through 35 of the Adder consists of a group of circuits, as described in detail later, comprising three inputs, and two outputs.

The three inputs are (1) an output from a corresponding column of the MR; (2) an output from a corresponding column of an Accumulator Register described below; (3) a carry output from the Adder columnar order to the right.

The two outputs are: (1) the sum output; (2) a carry output. The sum output is fed to a corresponding column of the Accumulator Register, while the carry output goes, to the Adder column, to the left. In conjunction with means for controlling the flow of information, the Adder circuitry performs the functions of addition, subtraction, multiplication and division, all as described presently, multiplication and division consisting of a series of additions or subtractions and shifts, so that multiplication and division are also performed, in part, by the Adder circuitry. The Adder is NOT a register, per se, and therefore does not perform any function of storage, but merely operates, on the information as it is passed therethrough.

The Accumulator Register is used for storing the output of the Adder, and the combination, of the Adder and the Accumulator Register may be regarded as an Accumulator. The Accumulator Register stores the results, of the operation performed, by the Adder. It consists of 38 columns, 2 of which, namely, Q and P, are for the purpose of overflow, and the other 36 comprising the 35 binary bits, of a full word, and the sign. Each of the columns of the Accumulator Register consists of a Delay Unit, similar to that used in the MR and the contents of the Accumulator Register may be shifted, either to the left or the right. The contents of the Accumulator Register, excluding the contents, of the overflow columns, may be stored, in Memory, by a STORE Instruction, which is given with a Memory address. In this STORE operation, the number is stored, in Memory, and the same number is left unaltered in the Accumulator Register.

The Multiplier Quotient Register, hereinafter referred to, as the MQ has two major functions. One, as its name implies, it holds the Multiplier, for multiplication operations and the Quotient, in division operations. The MQ comprises 36 columns, one, of which, stores a manifestation of the sign of the number stored in the MQ, the remaining 35 columns storing manifestations of the multidigit number itself. Each column contains a Delay Unit, of the type used in the MR, along with suitable switching circuits. Words may be read, from Memory, via the MR into the MQ register by means of a LOAD MQ Instruction, which includes a Memory address, and the contents of the MQ may be read out, and via Memory Buss Switches, be stored in Memory, by means of a STORE MQ Instruction which includes a Memory address. These Memory Buss Switches are illustrated in FIG. 1*e*, and are effective, as described below, to switch the holding of the Accumulator Register to the Memory Busses, for either full or half words, during a STORE Instruction, or to shift the contents of the MQ, either full or half words, to the Memory Busses, during a STORE MQ Instruction.

The Instruction Register (FIG. 1*f*) which may receive information from the MR, serves as a storage Register for an Instruction (a half word) read, from Memory, during an Instruction cycle. The Instruction Register stores the coded binary bit representation, of a particular Instruction, until this Instruction is completely executed, and it is then reset, during the early part of the next Instruction cycle, before a new Instruction, is read, into it, from Memory. Thus, the Instruction Register holds the complete Instruction and the Operation part, of this Instruction is available to an Operation Decoder (FIG. 1*f*) until the particular operation is complete, while the Address portion of the Instruction, is available to a Deflection Register (FIG. 1*e*) as described below. This Deflection Register comprises a plurality of electronic triggers, each respectively storing a binary bit representation, of the sign bit, and also of bits 6 through 17, inclusive. An Address Counter portion, of the Instruction Register, is utilized during multiply and divide operations, for the purpose of counting the number of cycles that the Machine completes, during the respective such operations. The purpose of this counter is to insure that a proper number of character cycles occurs, during each of these operations.

The Instruction Counter (FIG. 1*e*) is a 12 stage counter, each stage comprising an electronic trigger, the Counter output being fed to the Deflection Register during each Instruction cycle. The Instruction Counter receives a pulse at the END of each Operation so that on the next Instruction cycle, a succeedingly numbered address in Memory, will be referred to. The Instruction Counter may under certain conditions, also be stepped to cause a skipping of Instructions.

The Regeneration Counter (FIG. 1*e*) comprises ten stages each including an electronic trigger, respectively storing binary bit representations of the bits 6 through 15, inclusive. The Regeneration Counter output is fed to the Deflection Register during Execute/Regenerate and during Regenerate cycles and is stepped, one count, for each such cycle so that succeeding numbered addresses, in Memory, are addressed and Regenerated, during successive Execute/Regenerate and Regenerate cycles.

The Deflection Register has 12 orders, each comprising an electronic trigger, whose outputs feed to the Memory Deflection circuits and the Memory Control circuits. This Deflection Register therefore serves as a buffer between the Instruction Register, the Instruction Counter and the Regeneration Counter, on one hand and the Memory Deflection circuits and the Memory Control circuits, on the other hand. The Memory Deflection and Memory Control circuits, represented by the labeled block in FIG. 1*g*, identical to those described in detail in said above identified Fox et al. application, are effective to ADDRESS and UNBLANK the respective cathode ray tubes comprising Memory for both READING out of or WRITING in Memory.

The Operation Decoder decodes the manifestations of the "1" to "5" bit permutations which comprise the Operation part, of the Instruction to determine which one, of 32 possible Instructions, the machine will perform. The Operation Decoder comprises a diode matrix circuit which receives these permuted inputs and produces one output only, of any one of 32, thus signalling the particular kind of operation that is to be performed. The Operation Decoder, in accordance with which one of its 32 outputs is thus engaged, conditions selectively, various control circuits, which in turn produce the respective type of operation called for.

The information stored in Memory, is categoried into two general classes, according to the purpose for which it is used. These are Instructions and numerical information which is to be processed in accordance with the particular Instruction. The Calculator is made to distinguish between Instructions and numerical information by the selected type of cycle, causing Reading from memory. Information Readout of Memory, during an Instruction cycle is CHANNELED to the Instruction Register where the stored manifestations of the bits Read-Out comprise a representation of the Instruction. Information Read-out during an Execute cycle, is handled as numeric data. Numeric data is available, either in half words of 18 bits or in full words of 36 bits, but Instructions are ALWAYS half words. The Gate Generator, illustrated in FIG. 1*b*, controls the basic timing of the Machine and provides signals which are used in the respective operations, as described later. The Sign and Mixer circuit illustrated by a labeled block in FIG. 1*b* combine the outputs from the Sign bits, of the MR, the Accumulator Register, and the MQ, to provide signals indicating that the Signs, are alike or unlike.

A "carry" trigger is utilized to supply an indication that an end carry has occurred from the "Q" position of the Adder during certain operations. An Overflow trigger is utilized to supply an indication that a carry has occurred from the Adder "1" position to the overflow position "P" during certain operations or that a binary 1 has been shifted left from the Accumulator Register 1 position to the Accumulator Register "P" position during other operations.

In order to obtain a solution for a given problem, a Program is provided comprising a sequence of Instructions, and the respective Operations, carried out under control of these Instructions, in the sequence in which they appear or determined by intermediate results produce the desired solution of the problem. Both the Program and the numeric data for the problem are stored in the machine, the programmer, designing the program so that the steps are carried out in the proper manner.

The above referenced patent, of which this is a division, contains a description of the instruction repertoire of the machine.

Referring again to FIG. 1*b* of the composite diagram, certain circuits are represented by blocks labeled Carry and Overflow Triggers. It is the function of these circuits to develop certain timed pulses which will control the operation of the arithmetic unit per se.

Refer now to FIG. 2*a* which shows the circuitry for the Carry and Overflow triggers. If in the operation of the Arithmetic Unit, a carry output is emitted from the Q position of the Adder which is an end carry, the line ADDER (Q) goes positive and conditions one input of the AND circuit 501*a*. While this AND circuit is conditioned, an E/R4(D1) signal passes through the AND circuit and the diode 502*a* to turn ON the trigger 503*a*, Trigger 503*a* when ON, emits a positive signal via the cathode follower 506*a* to the line QC (this line when positive indicating that there has been a carry from the Q position). The trigger 503*a*, when OFF, represents a condition of no carry and at that time emits a positive output via the cathode follower 505*a* to the line NO QC. The trigger 503*a* is reset to an OFF condition, every character cycle, by an A1 (D1) signal feeding via the diode 504*a*.

The trigger 509*a* is the Overflow trigger. The trigger may be turned ON by a positive signal on the line AD (1) C/ACC (1) OV, which signifies that there has been a carry from the Adder 1 position or that a binary "1" has been shifted from the Accumulator Register 1 position to the overflow positions Q or P. This positive signal feeds through the diode 507*a* to turn the trigger 509*a* ON. Trigger 509*a*, when ON, emits a positive signal via cathode follower 510*a* to the line OV TRIG ON. The trigger 509*a* is reset OFF, when a positive signal occurs on the line R OV TR (signifying reset over flow trigger) which feeds through the diode 508*a*.

Refer now to FIG. 2*b*, which shows the circuit for indicating the Signs of the Accumulator Register, the Memory Register and the MQ Register. A positive output from the Accumulator Register Sign position, via line ACC (S) signifies that the Sign is negative. The signal on the line ACC (S) feeds via a cathode follower 550*a* to the line ACC (−), which is positive when the Accumulator Register contains a negative sign. The signal on the line ACC (−) feeds via an inverter 552*a* and a cathode follower 554*a* to the line ACC (+), which line is positive when the Accumulator Register Sign is positive.

Similar circuits are used for giving indications of the Memory Register Sign and the MQ Register Sign. A signal on the line MR (S) passes via a cathode follower 551*a* to the line MR (−), which is positive when the Memory Register Sign is negative. A signal on the latter line, passes via an inverter 553*a* and a cathode follower 555*a* to the line MR (+). It follows that line MR (+) is positive when the Memory Register Sign is positive.

The MQ Register sign position emits an output via the line MQ(S), which is positive when the Sign of the MQ Register is negative. The signal on this line MQ(S) feeds via a cathode follower 562*a* to a line MQ(−), which is positive when the MQ Register Sign is negative. The signal on the line MQ(−) feeds via an inverter 563*a* and a cathode follower 564*a* to the line MQ(+), which is positive when the MQ Register Sign is positive.

If both the Accumulator Register and the Memory Register signs are positive, lines ACC(+) and MR(+) are positive and feed to the AND circuit 566*a* which emits a positive signal to an OR circuit 558*a*. If however, both the Accumulator Register and the Memory Register Signs are negative, the AND circuit 557*a* is conditioned by positive signals on lines ACC(−) and MR(−) and emits positive output to the OR circuit 558*a*. Therefore, the output of the OR circuit 558*a* is positive when both the Accumulator Register and Memory Register Signs are alike, this signal passing via a cathode follower 560*a* to the line AMSA, which line is positive when both the Accumulator Register and the Memory Register Signs are alike. The output of the OR circuit 558*a* is negative, unless the signs are alike, and this signal is passed via an inverter 559*a* and the cathode follower 561*a* to the line AMSU. It follows that this line AMSU is positive when the Accumulator Register and the Memory Register Signs are unlike. A comparison is also made of the Memory Register and the MQ Register signs. If the Memory Register Sign is positive and the MQ Register Sign is positive, both inputs to the AND circuit 565*a* are positive, the output of which feeds to the OR circuit 567*a*. Likewise, if the Memory Register Sign is negative and the MQ Register Sign is negative, both inputs to the AND circuit 566*a*, via lines MR(−) and MQ(−) are positive, and its positive output feeds to the OR circuit 567*a*. It follows then that the output of the OR circuit 567*a*, is positive when both the Memory Register Sign and the MQ Register Sign are positive or if the Memory Register Sign and the MQ Register Sign are positive. The output of this OR circuit 567*a* feeds via a cathode follower 570*a* to the line MMSA. It follows the latter line is positive when the Memory Register Sign and MQ Register Sign are alike. The output of the OR circuit 567*a* also passes via an inverter 569*a* and a cathode follower 571*a*, to a line MMSU, which is positive when the Memory Register and the MQ Register Signs are unlike.

ARITHMETIC UNIT

*General*

By the Arithmetic Unit, per se, is meant the following devices, which will later be separately described:

(1) The Memory Register
(2) The Adder including the True/Complement control
(3) The Accumulator Register
(4) The Multiplier Quotient Register, and
(5) The Memory Buss Switches The relative location of each of these devices is illustrated by the composite formed of FIGS. 1*a* through 1*g*, assembled together as illustrated in FIG. 1*h*.

Briefly, the Memory Register, hereinafter referred to as the MR, contains 36 orders namely, S, and 1 through 35, of which the S order, and orders 1–4 and 35 are individually illustrated in FIG. 1*c*, the dash-dot lines, indicating the omitted orders, 5 through 34. The "S" order and orders 1 through 17, an exemplary one of which is illustrated in FIG. 4*a*, are similar to one another, while orders 18 to 35, an exemplary one of which is illustrated in FIG. 4*b* are also similar to one another.

The Adder comprises orders Q, P and 1 through 35, the broken away section of FIG. 1*d*, indicating the omitted orders 5 through 34. Orders Q and P are similar to one another and an exemplary one is illustrated in FIG. 4*d*, while orders 1 through 35 are similar to one another and an exemplary one is illustrated in FIG. 4*c*.

The Accumulator Register (FIG. 1*d*) comprises orders S, Q, P and 1 through 35, the broken away section in FIG. 1*d* indicating the omitted orders 5 through 34. The S order is illustrated in FIG. 4*e*, while an exemplary one, of the orders Q, P and 1 through 35, which are similar to one another, is illustrated in FIG. 4*f*.

The Multiplier Quotient Register (FIG. 1*g*) hereinafter referred to as MQ comprises orders, S, and 1 through 35, the broken away section in FIG. 1g indicating the omitted orders 5 through 34, each of the orders S, and 1 through 35 being similar and an exemplary one being illustrated in FIG. 4*g*.

The Memory Buss Switches (FIG. 1*e*) comprise orders S, and 1 through 35, the broken away section in FIG. 1*e* indicating the omitted orders 5 through 34, the S order and orders 1 through 17, being similar, and an exemplary one being illustrated in FIG. 4*i*. Orders 18 through 35 are also similar and an exemplary one is illustrated in FIG. 4*h*.

*Development of certain signals*

Before proceeding to a detailed description of each of the circuits which comprise the Memory Register, the Adder, the Accumulator Register, the MQ and the Memory Buss Switches, reference will be had to FIG. 1*a* which illustrates how HOLD signals are developed for preserving information in the Delay Units of the Memory Register and the Accumulator Register. If either one of the lines "MEM BUSS (S to 17) TO MR (S to 17)" or "MEM BUSS (18 to 35) TO MR (S to 17)" is positive, it acts via an OR circuit 101, an inverter 102, a cathode follower 103, and parallel connected power cathode followers 104 and 105 to render the line HOLD MR (S to 17) negative, so that whenever either the line "MEM BUSS (18 to 35) TO MR (S to 17)" or the line "MEM BUSS (S to 17) TO MR (S to 17)" goes positive, the line HOLD MR (S to 17) goes negative. If both inputs to the OR circuit 101 are negative, then the line HOLD MR (S to 17) remains positive. When either line CLEAR MR (18 to 35) or "MEM BUSS (18 to 35) TO MR (18 to 35)" connected to an OR circuit 106 is positive, the output of this OR circuit acts via an inverter 107, a cathode follower 108 and parallel connected power cathode followers 109 and 110 to drive the line HOLD MR (18 to 35) negative. If both the inputs to this OR circuit 106 are negative, the signal on the line HOLD MR (18 to 35) remains positive.

If either one of the respective inputs comprising line SHIFT ACC RIGHT, line SHIFT ACC LEFT or line ADDER TO ACC, goes positive, each of which feeds to an OR circuit 112, its output via an inverter 113, a cathode follower 114 and a power cathode follower 115, drives the line HOLD ACC negative. If all of these lines SHIFT ACC RIGHT, SHIFT ACC LEFT, or ADDER TO ACC are negative, the signal on the line HOLD ACC remains positive.

If input line "(+) TO ACC (S)" goes positive, which feeds to an inverter 116, its output via a cathode follower 117 drives the line HOLD ACC (S) negative. If the signal on the line "(+) TO ACC (S)" is negative, the signal on the line HOLD ACC (S) remains positive.

Figure 1G:
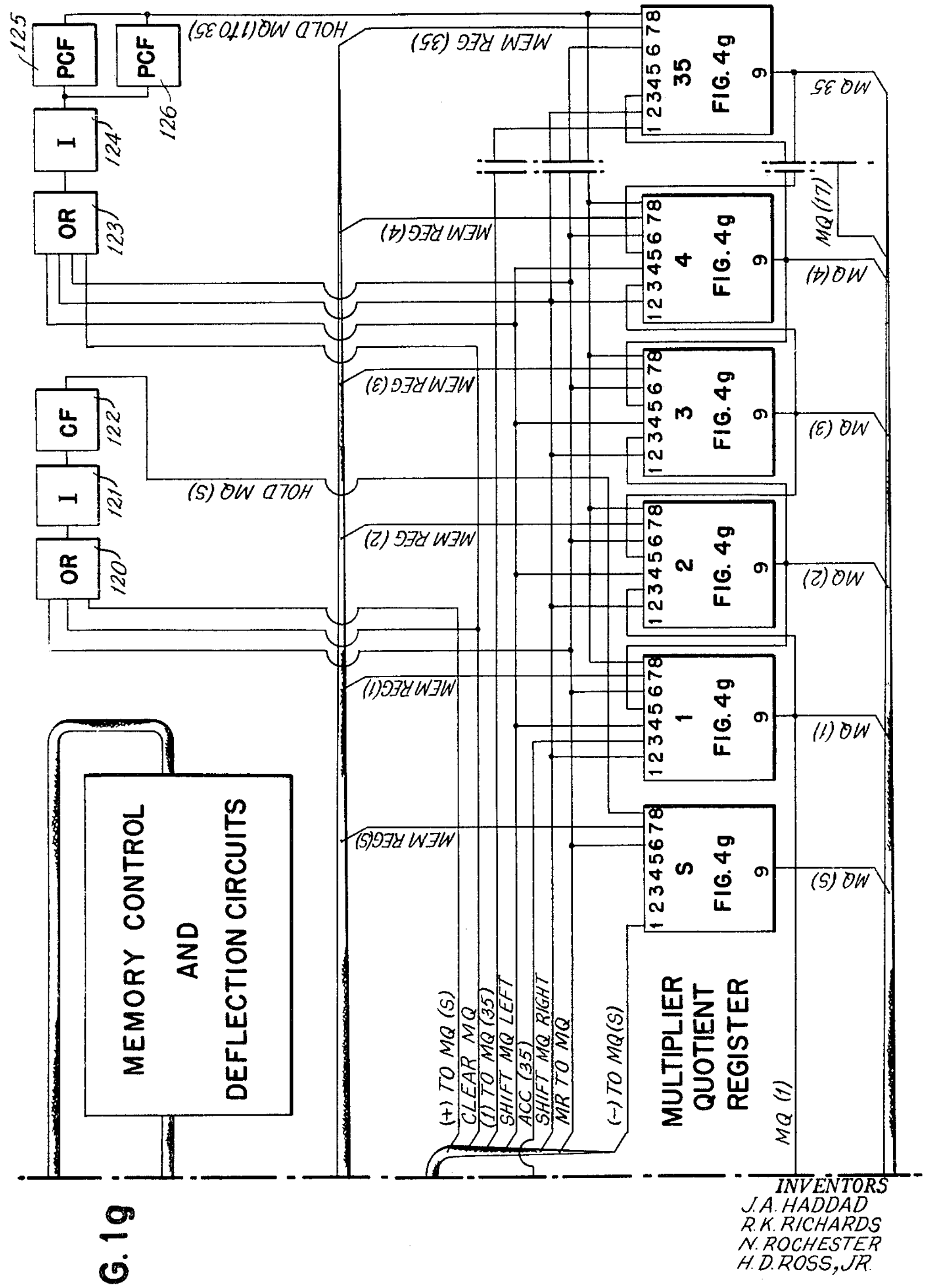

Referring now to FIG. 1*g* of the composite, a positive signal on any one of the input lines "(+) TO MQ (S)" CLEAR MQ or MR TO MQ, feeding to an OR circuit 120, produces an output which, via an inverter 121 and a cathode follower 122, drives the line HOLD MQ (S) negative. If any one of these lines "(+) TO MQ (S)", CLEAR MQ or MR TO MQ is negative, the line HOLD MQ (S) remains positive.

The OR circuit 123 (FIG. 1*g*) receives inputs via lines CLEAR MQ, SHIFT MQ LEFT, SHIFT MQ RIGHT and MR TO MQ, so that its output, via an inverter 124 and the parallel connected power cathode followers 125 and 126, render the line HOLD MQ (1 to 35) negative, when any one of these inputs to the OR circuit 123 goes positive. Otherwise the signal on the line HOLD MQ (1 to 35) remains positive.

(1) MEMORY REGISTER

Referring to the blocks of FIG. 1*c* representing the Memory Register, a signal on the line HOLD MR (18 to 35) feeds to terminal 3 of the block representing Memory Register order 35 and this line also feeds to the respective terminals 3 of orders 18 through 34. The line HOLD MR (S to 17) feeds to terminals 5 of the blocks representing Memory Register orders S, and 1 through 17, as represented, for example, by the blocks illustrated for orders S, and 1 through 4. The line "MEM BUSS (18 to 35) TO MR (18 to 35)" feeds to terminal 1 of the block representing Memory Register order 35, and also to the terminal 1 of Memory Register orders 18 through 34. The line "MEM BUSS (18 to 35) TO MR (S to 17)" feeds to terminal 3 of Memory Register orders S, and 1 through 17. The line "MEM BUSS (S to 17) TO MR (S to 17)" feeds to terminal 1 of each of the Memory Register orders, S and 1 through 17.

It should be noted that the Memory Buss line MEM BUSS (35) feeds to terminal 2 of the block representing the Memory Register order 35 and similarly, orders 18 through 34, which are similar to order 35, receives inputs from "corresponding" Memory Busses, respectively. It should also be noted that the line MEM BUSS (S) feeds to terminal 2 of the Memory Register S order, the line MEM BUSS (1) feeds to terminal 2 of the Memory Register 1 order, the line MEM BUSS (2) feeds to terminal 2 of the Memory Register 2 order and "corresponding" Memory Register Busses feed to Memory Register orders 3 through 17.

The line MEM BUSS (18) feeds to terminal 4 of the S order of the Memory Register, as well as to the "18" order, the line MEM BUSS (19) feeds to terminal 4 of the Memory Register order 1, as well as to the "9" order, etc., so that Memory Register orders S through 17 receive inputs from BOTH "corresponding" Memory Buss orders and also from Buss orders, which are 18 orders removed from the corresponding orders of the Memory Register. If a full word is Addressed, the Sign bit and bits 1 through 35 of the full word are Read out of Memory to the Memory Busses, S and 1 through 35, as described in said above identified application of Fox et al. At the same time, the Control Circuits apply positive signals to line "MEM BUSS (S to 17) TO MR (S to 17)" of FIG. 1*c*, and to line "MEM BUSS (18 to 35) TO MR (18 to 35)" while negative signals are applied, as described above, to the lines HOLD MR (S to 17) and HOLD MR (18 to 35). By the combination of these signals, just described, the respective holding of each Memory Buss S, and 1 through 35, is gated to the Memory Register orders S, and 1 through 35. If an ODD half word is Addressed, the line "MEM BUSS (18 to 35) TO MR (S to 17)" is plus (FIG. 1*a*) and produces a negative signal on the line HOLD MR (S to 17) of FIGS. 1*a* and 1*c*, as described above, and at the same time, a signal, CLEAR MR (18 to 35) is generated (FIG. 1*a*), as described above, to produce a negative signal on the line HOLD MR (18 to 35) (FIGS. 1*a* and 1*c*). By means of these signals, information is gated from the Memory Busses 18 to 35 to the Memory Register orders 18 to 35, which are in effect reset to zeros, by reason of the negative signal on line HOLD MR (18 to 35). If an even half word is called for, from Memory, then a positive signal occurs on the line "MEM BUSS (S to 17)" as described above (FIG. 1*a*) to produce a negative signal on the line HOLD MR (S to 17) which is fed to FIG. 1*c*, and a positive signal, produced on the line CLEAR MR (18 to 35) of FIG. 1*a*, will produce a negative signal on the line HOLD MR (18 to 35) which is fed to FIG. 1*c* to produce a gating of information from the Memory Busses S, and 1 through 17, to the Memory Register orders S, and 1 through 17, while Memory Register orders 18 through 35 are effectively reset to zeros by the negative potential of the line HOLD MR (18 to 35).

Referring to FIG. 4*a*, there is illustrated therein, a circuit exemplary of the respective Memory Register orders S, and 1 through 17. The storage device, per se, of this circuit is a Delay Unit **706*a*, of the type described in detail in the above referenced parent application. This Delay Unit 706*a* may receive inputs via AND circuits 701*a*, 702*a* or 703*a*. The outputs of these AND circuits 701*a*, 702*a*, or 703*a*, pass via an OR circuit 704*a* and a cathode follower 705*a* to this Delay Unit. Thus, if the output of any one of these AND circuits 701*a*, 702*a* or 703*a*** is positive, a positive signal is fed to this Delay Unit.

The signal applied to terminal 5 of FIG. 4*a*, is in turn fed via a line HOLD MR (S to 17) to one input of the AND circuit **701*a*, whose other input may be conditioned by the output from the Delay Unit 706*a*, so that when this output IS positive to so condition this other input of AND circuit 701*a*, the output of the Delay Unit 706*a* passes through and via OR circuit 704*a* and the cathode follower 705*a***, back to the Delay Unit, to thus complete the recirculation loop which, as described above, maintains a manifestation of a binary 1 bit stored in the Delay Unit until the recirculation loop is broken by making line HOLD MR (S to 17) negative.

Whenever a full or an even half word is called for, the line MEM BUSS (S to 17) TO MR (S to 17) is fed, via terminal 1, condition one input of the AND circuit **703*a* which receives a second input via terminal 2, to a "corresponding" Memory Buss "N," that is, a particular buss "corresponding" in number to the particular Memory Register order. If the signal on the line MEM BUSS (N) is positive, it feeds through the now conditioned AND circuit 703*a* and via the OR circuit 704*a* and the cathode follower 705*a*, the Delay Unit 706*a***. At the same time that the signal to terminal 1 goes positive, the signal on terminal 5, goes negative to break the recirculation loop, to thus effectively erase the former holding of the Delay Unit, while the new information is Read-In. The signals on the line "MEM BUSS (S to 17) TO MR (S to 17)" normally goes positive, for one microsecond, when the transfer of information is to take place.

A third source of input to the Delay Unit **706*a* is via the AND circuit 702*a* which receives information from that Memory Buss order, which is 18 orders removed to the right, of the "corresponding" order of the Memory Register, that is N+18 orders. This occurs when an ODD half word is Addressed. The line connected to terminal 4 is MEM BUSS (N+18) which corresponds to a Memory Buss order, 18 bits to the right of the Memory Register order under consideration. This line, when positive, conditions one input of this AND circuit 702*a*, so that a one microsecond signal on the line "MEM BUSS (18 to 35) TO MR (S to 17)" from terminal 3, passes via this now conditioned AND circuit 702*a*, the OR circuit 704*a*, and the cathode follower 705*a* to the Delay Unit 706*a*. At the same time, the line HOLD MR (S to 17) from terminal 5 goes negative, to break the recirculation loop, so that during the one microsecond period, the former holding of the Delay Unit 706*a* is erased, and a new bit of information is stored via the AND circuit 702*a*. The output of the Delay Unit 706*a*** is applied via line MR (N) OUTPUT to terminal 6 to thus manifest the bit stored in the Delay Unit of the particular (N) order of the Memory Register.

By reference to the Timing Diagram of FIGS. 3*f* and 3*g*, it is seen that during an Instruction cycle, the signals MEM BUSS (S to 17) TO MR (S to 17), MEM BUSS (18 to 35) TO MR (18 to 35), MEM BUSS (18 to 35) TO MR (S to 17) and CLEAR MR (18 to 35) are one microsecond signals, occurring at I9 time of each such Instruction cycle.

Referring to FIG. 4*b*, there is illustrated a Memory Register order exemplary of any one of the orders 18 to 35. A Delay Unit **711*a* is provided with two input sources. The output of the Delay Unit 711*a* feeds back to one input of an AND circuit 707*a***, whose other input, via terminal 3 and line HOLD MR (18 to 35) when positive, permits recirculation of the Delay Unit output, when positive, as described above in connection with FIG. 4*a*. The other input to Delay Unit **711*a* is via an AND circuit 708*a* which receives information on one of its inputs from Memory Buss order (N) "corresponding" to THE Memory Register order under consideration. This AND circuit 708*a* is gated by a positive signal on its other input, received via terminal 1 and line MEM BUSS (18 to 35) TO MR (18 to 35), to pass the information on this "corresponding" Memory Buss (18 to 35) to the Delay Unit 711*a***. As is seen from the Timing Diagram of FIG. 3*f*, this signal MEM BUSS (18 to 35) TO MR (18 to 35) occurs at I9 (D1) time. Simultaneously, (FIG. 1*a*) this signal produces a negative signal on line HOLD MR (18 to 35) which negative signal is applied via terminal 3 (FIG. 4*b*) via line HOLD MR (18 to 35) to one input of the AND circuit **707*a* to break the recirculation path and thus erase the former holding of the Delay Unit 711*a*. Both AND circuits 707*a* and 708*a* feed via an OR circuit 709*a* and a cathode follower 710*a* to the Delay Unit 711*a***. The output of this Delay Unit is via a line MR (N) OUTPUT which is thus representative of the binary 1 or binary 0 manifestation, stored in the Delay Unit in the respective order of the Memory Register. The outputs of the Memory Register orders S, and 1 through 35 (with the exception of the S order, which is described below) feed to corresponding orders of the Adder (FIGS. 1*c* and 1*d*) and MR orders S, and 1 through 35, ALL feed via the wires and cables, as shown in FIGS. 1*c*, 1*d* and 1*g* to "corresponding" orders of the MQ. Further, orders S, and 1 through 17 of the MR feed, via the wires and cable as shown in FIGS. 1*c*, 1*d*, 1*e* and 1*f* to the Instruction Register (FIG. 1*f*) as stated above.

Referring to the Timing Diagram, FIG. 3*f*, it is seen that this transfer from MR to the Instruction Register takes place at I10 (D1) time, which is subsequent to I9 (D1) time, when, as described above, a full or a half word is gated from the Memory Busses to MR. Further, it is noted from the Timing Diagram of FIG. 3*f* (under EXECUTE) that the lines MEM BUSS (S to 17) TO MR (S to 17), MEM BUSS (18 to 35) TO MR (18 to 35), MEM BUSS (18 to 35) TO MR (S to 17) and CLEAR MR (18 to 35) may receive positive one microsecond signals at E9 time. These signals, occurring during Execute cycles, are effective, when a word is being read-out of Memory, to the Memory Register, preparatory to being operated on during a particular Instruction called for. Thus it is seen that either full or half words may be read-out of Memory, during an Execute cycle, while during an Instruction cycle, a half word only is read-out of Memory, since each Instruction comprises a half word only.

(2) ADDER AND TRUE/COMPLEMENT CONTROL

Referring to FIGS. 1*d*, 4*c* and 4*d*, it is seen that the Adder True/Complement control sections of orders Q, P and 1 through 35, receive inputs from "corresponding" Accumulator Register orders, via the respective input terminals 3, while orders 1 through 35 of the Adder also receives inputs, from "corresponding" Memory Register orders, via the respective input terminals 5. Orders Q, P and 1 through 34 receive Carry inputs, via the respective input terminals 2 from the order to the right, the order 35 input terminal 2 receiving a Carry from the Q order, developed as described above, which may be an "artificially injected" Carry. Each of the Adder orders, Q, P and 1 through 35 has an output, via a respective output terminal 8, which is connected to an input terminal 2 of a "corresponding" order of the Accumulator Register and each Adder order feeds a Carry from its terminal 7 to an input terminal 2 of the Adder order to the left with the exception of the Q order, which feeds to the 35 order, as described below.

There are four control signals feeding to the Adder. One is an E/R 1 (D4) signal on the line MR to ADDER (see FIG. 3*g*) for gating the holding of the MR to the Adder (see also FIGS 1*d* and 4*c*) the second is an E/R 1 (D4) on line ACC TRUE TO ADDER (see FIG. 3*g*) for gating the holding of the Accumulator Register, in True form, to the Adder (see also FIGS. 1*d* and 4*c*) the third control signal is an E/R 1 (D4) signal, or, on occasion, an E/R 7 (D2) signal on line ACC COMP TO ADDER (for both see FIG. 3*g*) for transferring the holding of the Accumulator Register, in Complement form, to the Adder (see also FIGS. 1*d* and 4*c*) while the fourth control signal E/R 1 (D4) on line CARRY ADDER (35) (see FIG. 3*g*), which is effective, to insert a Carry, into the Adder order 35 (see FIG 1*d* and the "equivalent" Carry In signal of FIG. 4*c*). This latter Carry, as stated above, may be an "artificial" Carry or may be the Carry output of the Q order, of the Adder. The Carry output from terminal 7 of the Q order (FIGS. 1*d* and 4*d*) feeds to a line labeled ADDER Q CARRY in FIG. 1*d*, but it is to be recalled that, as described above, this Carry passes through additional switching circuits, before feeding to the Adder order 35 input terminal 2, as the signal on line CARRY ADDER (35) of FIG. 1*d*.

Referring to FIG. 4*c*, there is illustrated an exemplary order, representative of any one of the Adder orders 1 through 35, respectively, including the True/Complement controls, associated with the respective order. The input to the Adder, per se, is via lines X, Y and Z, representing, respectively, the Accumulator Register output to the Adder, the Memory Register output to the Adder, and a carry input, from the next lower order stage. The corresponding Sum and Carry outputs are represented, respectively, on the lines SUM OUT and CARRY OUT.

The output, from the corresponding order of the Memory Register, is fed to terminal 5, and thus to line MR (N) to thereby condition an AND circuit 721*a*. This output from the Memory Register, therefore, if positive, represents a binary 1, to thus gate a four microsecond signal, applied via terminal 6 to the line MR TO ADDER (see FIG. 3*g*) at E/R 1 (D4) time, to the AND circuit 721*a*, so that it passes via a non-inverting amplifier 722*a* of the type described in the above referenced patent of which this is a division and a cathode follower 723*a*, to the line Y. If this output from the Memory Register is a binary 0, then the line MR (N) is negative, which prevents passage of the four microsecond signal, so that the line Y remains negative.

The output from the corresponding order of the Accumulator Register, feeds to terminal 3, and thus to line ACC (N). The signal on this line, is positive, when a binary 1 is stored, in the corresponding order of the Accumulator Register, but is negative, when a binary 0 is stored therein, and feeds to an AND circuit 711*a* and also to an inverter 712*a*. Assuming that binary 1 is stored in the corresponding Accumulator Register order, the AND circuit 711*a* is conditioned, so that, as a four microsecond signal is fed to the terminal 4 and line ACC TRUE TO ADDER at E/R 1 (D4) time (FIG. 3*g*) this signal passes via the now conditioned AND circuit 711*a*, an OR circuit 715*a*, a non-inverting amplifier 716*a*, and a cathode follower 718*a* to the line X. Thus, if the output of the corresponding Accumulator Register order is a binary 1, and the line ACC TRUE TO ADDER is conditioned, there will be a binary 1 positive output, from the cathode follower 718*a* to the line X. If a binary 0, however, were present, in the corresponding Accumulator Register order, then the 4 microsecond signal E/R 1 (D4) is not gated to the AND circuit 711*a* since the latter would not be conditioned.

Assuming a positive signal on line ACC (N), representing a binary 1, this also feeds through the abovementioned inverter 712*a*, and a cathode follower 713*a*, to one input of an AND circuit 714*a*. Under the conditions assumed, this AND circuit 714*a* would not be conditioned, since the positive output, from the Accumulator Register has been inverted by inverter 712*a*. However, if a binary 0, were present, in the corresponding Accumulator Register order, the signal on the line ACC (N) would be negative, and by inversion in inverter 712*a*, would condition the AND circuit 714*a*. The other input to this AND circuit 714*a*, is via line ACC COMP TO ADDER, connected to terminal 1 to which an E/R 1 (D4) signal is applied (FIG. 3*g*) and, with a binary 0 output assumed, as next above, will pass through the conditioned AND circuit 714*a*, the OR circuit 715*a*, the non-inverting amplifier 716*a*, and the cathode follower 717*a* to the line X.

Thus, it is possible to have either a True or a Complement representation of the holding of the corresponding Accumulator Register order, applied to the line X, which feeds to an OR circuit 718*a*, and also to one input of a three input AND circuit 724*a*, and to one input of the two input AND circuit, 728*a* and 729*a* of the Adder, per se.

There are occasions when an E/R 7 (D2) signal occurs on the line ACC COMP TO ADDER (FIG. 3*g*) and in such instances, the Complementing of the Accumulator Register output takes place at "7" time, it being noted that the positive signal, if there be one, reaching the line X from the cathode follower 717*a*, is a 2 microsecond signal instead of a 4.

The input to terminal 2 feeds the line CARRY IN which is a Carry output, from the succeeding lower order, and is substantially coincident with the signals, present on the lines X and Y, since there is relatively no time delay in the passage of information, through the Adder, for the forming of the Sum and Carry outputs.

In brief summary, there are three possible inputs to the Adder per se, one via line X, which is the True or Complement representation of the corresponding binary 1 or binary 0 value stored in the Accumulator Register, secondly an input via line Y, which is the binary 1 or binary 0 manifestation of the value, stored in the corresponding order of the Memory Register, and thirdly, a signal on line Z, which is the Carry, from the next lower order of the Adder. The outputs of certain blocks of the Adder, may be tabulated as follows:

The output of the OR circuit 718*a* is positive, if there is a binary 1 present, on at least one of the inputs X, Y or Z. The output of the AND circuit 724*a*, is positive, if, and only if, there are binary 1's present on all three inputs X, Y and Z. The output from the AND circuit 728*a* is positive, if there are binary 1's present on input lines X and Y. The AND circuit 729*a* has a positive output, if there are binary 1's present on input lines X and Z. The output of the AND circuit 730*a* is positive, if binary 1 inputs are present on input lines Y and Z. The outputs of the AND circuits 728*a*, 729*a* or 730*a*, when positive, signify a Carry, since a sum of at least 1+1 is represented. The outputs of all these three AND circuits, fed to an OR circuit 731*a*, so that its output is positive, if a Carry has occurred. This output feeds, via non-inverting amplifier 732*a* and a cathode follower 733*a* to the line CARRY OUT, which feeds, via a terminal 7, to the Carry input, of the next higher order. The signals on this line CARRY OUT also feed, via an inverter 726*a* and a cathode follower 727*a* to an OR circuit 725*a*. Thus, this input, to the OR circuit 725*a*, via the cathode follower 727*a*, is positive, only if there has been no carry. Therefore, if no carry output has occurred, a positive signal is passed, through this OR circuit 725*a*, to condition an AND circuit 719*a*. The second input to this AND circuit 719*a* is via the OR circuit 718*a*, whose output is positive, as stated above, if at least one input X, Y or Z contains a binary 1. Therefore, the output of the AND circuit 719*a*, is positive, provided there is no carry and there is, at least one, input to the OR circuit 718*a*. This output of the AND circuit 719*a* passes via a cathode follower 720*a* to the line SUM OUT and thus to terminal 8.

Thus, it is seen that if there are two binary 1 inputs to However, if there is only one binary 1 input, to the Adder, there is no Carry output so that plus is applied via the OR circuit 725*a*, whose output comprises one input to the AND circuit 719*a*, which, with one input, thus positive, to the OR circuit 718*a*, this AND circuit 719*a* passes a signal, via the cathode follower 720*a* to provide a Sum output.

There still remains to be considered the condition, wherein binary 1's are present, on all three lines X, Y and Z which provide not only a Carry output but also a Sum output. Thus, if all three lines X, Y and Z are positive, representing binary 1's, the output of the AND circuit 724*a*, is positive, and feeds, via the OR circuit 725*a* to condition the AND circuit 719*a*. The AND circuit 719*a* will then pass a positive signal, applied to it via the OR circuit 718*a*, which has a positive output since all three of its inputs are positive (only one being necessary to develop a positive output) and the output of AND circuit 719*a* is applied via the cathode follower 720*a* to the line SUM OUT and thus to terminal 8. At the same time, a Carry output will be developed, since AND circuits 728*a*, 729*a* and 730*a* all emit positive signals which pass via the OR circuit 731*a*, the non-inverting amplifier 732*a* and the cathode follower 733*a* to the line CARRY OUT and to terminal 7.

Referring now to FIG. 4*d*, which illustrates an exemplary circuit representative of the Adder orders P and Q, the input, from the "corresponding" order of the Accumulator Register, passes through True-Complement control circuits, identical to those described above for the Adder orders 1 through 35, blocks 741*a* through 747*a* of FIG. 4*d*, corresponding to the blocks 711*a* through 717*a* of FIG. 4*c*. Thus, it is seen that signals, on line "A" of the Adder per se, in FIG. 4*d*, represent either True or Complement, binary 0 or binary 1 value manifestations, from corresponding orders of the Accumulator Register. Likewise, when input terminal 2, (FIG. 4*d*) is positive, to represent a binary 1 Carry, it is fed via the line CARRY IN, to line B of the Adder, per se. The operation of the remaining circuitry of FIG. 4*d*, is that of a half Adder, having two inputs. If there are binary 1 inputs, that is positive signals, on both lines A and B, simultaneously, the resulting SUM is zero, with a Carry of a binary 1. If there is a binary 1 present on line A, but a binary 0 on line B, the result is a binary 1 SUM and a binary 0 Carry. Likewise, if there is a binary 0 on line A, but a binary 1 on line B, the result is a SUM of binary 1 and no Carry. The final condition, if there are binary 0's on both lines A and B, produces a SUM of binary 0, and a Carry of binary 0. The output of the AND circuit 748*a* is positive, only when it receives two positive inputs, so that if both lines, A and B, have binary 1's, the output of the AND circuit 748*a* goes positive, and via a cathode follower 749*a*, drives the line CARRY OUT, positive, which is applied to terminal 7. When a binary 1 is present, on either line A or B, or both, the output of the OR circuit 752, goes positive, and conditions the AND circuit 753*a*. If a Carry output, did occur, which signifies that both lines A and B contain binary 1's, the positive output of a cathode follower 749*a*, signifying a binary 1, is inverted, by an inverter 750*a*, and passed via a cathode follower 751*a* to an AND circuit 753*a*. Thus, if both lines A and B contain binary 1's, the result is a Carry output, but the Sum output is blocked, from passing through the AND circuit 753*a*. However, if a binary 1 is present on line A or B, there still is a positive output, from the OR circuit 752*a*, and, since there is no carry, the inverter 750*a* cannot invert, a plus input, since there is none, so that the AND circuit 753*a* IS conditioned, and a positive output from the OR circuit 752*a* passes through this conditioned AND circuit 753*a*, and the cathode follower 754*a*, to the line SUM OUT and thus to terminal 8.

Thus, it is seen that if binary 1's are present on both lines A and B, a binary 1 Carry output is developed, but the SUM output is a binary 0. If a binary 1 is present, on line A or B, a binary 0 Carry output is developed, but the SUM output is a binary 1. If binary 0's are present on both lines A and B, then both output lines, the SUM OUT and CARRY OUT, remain negative to signify binary 0's.

(3) ACCUMULATOR REGISTER

Referring again, to FIG. 1*d* a block diagram of the Accumulator Register is illustrated therein. It is to be noted that the Sign order (see also FIG. 4*e*) is different from all the other orders of the Accumulator Register (see FIG. 4*f*).

The Q, P and 1 through 35 orders, are alike and an exemplary order is illustrated in FIG. 4*f*.

Each order of the Accumulator Register comprises a Delay Unit, of the type as described above, and as indicated (FIGS. 4*e* and 4*f*, respectively), there are two sources of HOLD voltage namely, the line HOLD ACC(S) (FIG. 4*e*) and the line HOLD ACC (FIG. 4*f*).

The line HOLD ACC(S) for the Sign order is connected to terminal 2 (FIG. 4*e*), while the line HOLD ACC (FIG. 4*f*) is connected to terminal 7 and feeds to all the Accumulator Register orders Q, P and 1 through 35. These orders, Q, P and 1 through 35 each receive said input, from "corresponding" orders of the Adder and these same orders have outputs, which feed to respective terminals 3 (FIG. 1*d*) of the True/Complement controls, described above, of corresponding orders, of the Adder.

Order 35, of the Accumulator Register (FIG. 1*d*) receives an input via its terminal 4, from the MQ order 1 (FIG. 1*g*) which is effective, when the control line "MQ (1) TO ACC (35)" feeding to terminal 3 of this 35th order (FIG. 1*d*) goes positive (see also FIG. 4*f*) to permit the contents of MQ order 1 to be introduced into the Accumulator Register 35. On a LONG SHIFT LEFT Instruction, as described below, this signal "MQ (1) TO ACC (35)" is applied to terminal 3 of the 35th order, instead of SHIFT ACC LEFT (FIG. 4*f*). The outputs of "corresponding" orders of the Adder, are gated to the Accumulator Register as the line ADDER TO ACC connected to the respective terminals 1 (FIGS. 1*d* and 4*f*) goes positive. A signal on this line (FIG. 1*a*) also causes the line HOLD ACC, to go negative, at the same time, as described above, in connection with FIG. 1*a*. The holding of the Accumulator Register may also be shifted, to the right, or to the left, by positive signals on the respective lines SHIFT ACC RIGHT connected to the respective terminals 5, or line SHIFT ACC LEFT connected to the respective terminals 3 (FIGS. 1*d* and 4*f*), this shifting occurring, at the rate of one order, for each microsecond that the respective lines are positive. The signals on the lines SHIFT AC RIGHT AND SHIFT ACC LEFT (FIG. 1*a*) also respectively cause the line HOLD ACC to go negative (see also FIG. 4*f*).

It should be noted that the outputs at respective terminals 8 of the Accumulator Register orders feed to an input terminal 4, of the next higher order (FIG. 1*d*) and also to an input terminal 6, of the next lower order. It is these output signals, which are gated to the respective Delay Units, during a SHIFT ACCUMULATOR LEFT or a SHIFT ACCUMULATOR RIGHT operation, as the case may be, or during a LONG SHIFT LEFT or a LONG SHIFT RIGHT operation. The output of the Q order shifts to the right only, so that in FIG. 4*f*, the line SHIFT ACC LEFT is not used, in the Q order.

The output of Accumulator Register order 35, besides feeding to order 34 also feeds to terminal 3 of the MQ 1 order (FIGS. 1*d*, 1*g* and 4*g*). The orders S and 1 through 35 of the Accumulator Register also have outputs (FIGS. 1*d* and 1*e*) which feed to "corresponding" orders of the Memory Buss Switches, described below. As the Accumulator Register is shifted left, the output of the 1 order is connected to the SIGN MIXING CIRCUITS (FIGS. 1*d*, 1*e* and 1*b*) and thence to the Overflow Trigger (FIG. 1*b*), as described above. Therefore, if a binary 1 is stored in the Accumulator Register 1 order, and the Accumulator Register is shifted to the left, one order, an Overflow automatically results.

Referring now to FIG. 4*e*, which illustrates the Accumulator Register Sign order, again the basic storage element is a Delay Unit designated as 764*a*. The condition of the Delay Unit is dependent upon the binary 1 or binary 0 character of the inputs, from either one of two sources. One is the recirculating feed back, feeding from the output of the Delay Unit and passing through the AND circuit 761*a*, provided the line HOLD ACC(S) connected to the terminal 2, is positive, to thereby condition this AND circuit 761*a* whose output then passes, via an OR circuit 762*a* and a cathode follower 763*a*, to the input of the Delay Unit 764.

On occasions, when it is necessary to put a positive Sign indication into the Delay Unit, that is, a holding of a binary 0, the HOLD ACC(S) voltage only, is made negative, (see inverter 116 and cathode follower 117 of FIG. 1*a*) so that the line HOLD ACC(S) of FIG. 4*e* is rendered negative, and thus, negardless of what was formerly stored in the Delay Unit, the Delay Unit output then goes negative, which need not be recirculated, since a negative output is produced by the Delay Unit unless it is forced to produce a positive output, which positive output, must be circulated to be sustained, all as described in the above under referenced patent of which this is a division.

However, when it is necessary to enter a negative Sign, into the Accumulator Sign order (a binary 1) a positive signal is fed directly into the OR circuit 762*a* (FIG. 4*e*) via input terminal 1, to line "(−) TO ACC(S)" implying Minus Sign TO ACC(S) order. The effect of this positive input to this OR circuit 762*a*, which passes directly via the cathode follower 763*a*, to the Delay Unit 764*a*, even though the AND circuit 761*a* is operative for feed back, is to inject a binary 1, that is a positive signal, into the Delay Unit, regardless of what was there previously. The recirculating loop of the Delay Unit is not broken at this time. Thus, if a binary 1 was formerly stored in the Delay Unit, it is recirculated, in an attempt to again store a binary 1, which merely results, in a binary 1 being stored (if a binary 0 is stored, no recirculation is produced, since none is required). The output of the Sign position, via line ACC(S) to terminal 3, is positive to indicate the storage of a "negative" Sign and conversely if negative to indicate a "positive" Sign. The output terminal 3, as indicated in FIGS. 1*d* and 1*e* is connected to terminal 2 of the Memory Buss Switches, order S, described below and also is connected, as shown in FIG. 1*e* and 1*a* to the Sign Mixer circuits, described above in connection with FIG. 2*b*.

Referring to FIG. 4*f*, there is illustrated an exemplary circuit representative of the Accumulator Register orders Q, P, and 1 through 35. It may be noted (see FIG. 1*d*) that input terminals 5 and 6, of the Q position, are not used, so that consequently, the AND circuit 773*a* (FIG. 4*f*) and its corresponding output to the OR circuit 775*a*, are not employed, in this Q order. The circuitry of these orders is somewhat similar to the circuitry of the orders of the Memory Register, described above, in that a Delay Unit 777*a* (FIG. 4*f*) comprises the storage element, per se. of the respective orders. As illustrated in FIG. 4*f*, this Delay Unit 777*a*, may receive an input, via one of four AND circuits. The Delay Unit may receive an input, as its output is recirculated, via an AND circuit 774*a*, provided line HOLD ACC, which is connected to terminal 7, remains positive, thus conditioning this AND circuit, whose output passes via an OR circuit 775*a*, and a cathode follower 776*a* to this Delay Unit 777*a*. The signal on the line HOLD ACC is, of course, driven negative, as described above, whenever any SHIFT LEFT or SHIFT RIGHT signal is given, and also when the holding of the Adder is being gated to the Accumulator Register. The effect of the interruption of this HOLD signal is effectively to erase, whatever is already stored in the Delay Unit, since only a binary zero can exist with this AND circuit 774*a* de-conditioned.

Referring to the AND circuit 773*a* of FIG. 4*f*, this receives input signals via line SHIFT ACC RIGHT connected to terminal 5, and via line ACC (N+1) OUTPUT connected to terminal 6, this line comprising the output, from the next higher order of the Accumulator Register. Upon a coincidence of two such positive inputs, the output of the AND circuit 773*a* goes positive, and via the OR circuit 775*a* and the cathode follower 776*a* applies a positive signal to the Delay Unit 777*a*. Thus, whenever a signal of 1 microsecond duration is given, calling for a SHIFT ACC RIGHT operation, the output of the next higher order of the Accumulator Register is gated via this AND circuit 773*a* to the Delay Unit 777*a*. At the time that the line SHIFT ACC RIGHT, goes positive, the line HOLD ACC, is negative, and is thus effective, to erase the former holding of the Delay Unit. At the end of the 1 microsecond period, the line HOLD ACC, again becomes positive, to hold the newly stored bit of information, which was received from the next higher order of the Accumulator Register. If the signal on the line SHIFT ACC RIGHT is of a sufficient duration, say several microseconds, a shift from the next higher order of the Accumulator Register occurs, during each microsecond, the line HOLD ACC remaining negative during that period. Thus, for each microsecond that the line SHIFT ACC RIGHT is positive, a bit of information, is successively shifted, one order, for each such microsecond that the line SHIFT ACC RIGHT is positive, a bit of information, is successively shifted, one order, for each such microsecond, to succeeding lower orders of the Accumulator Register. It is an inherent characteristic of a Delay Unit such as Delay Unit 777*a*, as described above, which allows an input signal to arrive, at the Delay Unit input, at the same time an output signal is being emitted, by this Delay Unit, indicative of what was formerly stored in that Unit.

The AND circuit 772*a* serves a function, similar to that of AND circuit 773*a*, except that it is for SHIFT LEFT. Here, an input signal on terminal 3 is applied to line SHIFT ACC LEFT to condition this AND circuit 772*a*, while the output of the next lower order, of the Accumulator Register, is applied via terminal 4 to line ACC (N−1) OUTPUT and this output, from the next lower order, is passed via this AND circuit 772*a*, the OR circuit 775*a*, and the cathode follower 776*a*, to the Delay Unit 777*a*. Again, a shifting of a bit of information, to a successive order of the Accumulator Register (shifting to the left) occurs, for each microsecond that the line SHIFT ACC LEFT, is positive, line HOLD ACC remaining negative during that time.

The AND circuit 771*a* receives inputs from "corresponding" Adder order SUM outputs, via the terminal 2, feeding to the line SUM OUTPUT. If this AND circuit 771*a* is conditioned, by a positive voltage on line ADDER TO ACC connected to terminal 1, which may be either an E/R4(D1) or an E/R8(D1) signal (see Timing Diagram FIG. 3*g*) then the SUM OUTPUT is gated through this AND circuit 771*a*.

Thus, upon coincidence of two positive inputs, the output of this AND circuit 771*a*, goes positive, and via the OR circuit 775*a* and the cathode follower 776*a*, feeds a positive signal to the Delay Unit 777*a*. If the SUM OUTPUT of the "corresponding" Adder order is a binary 0, this signal on the line SUM OUTPUT, is negative, and the signal input to the Delay Unit 777*a* is negative, to thereby store a binary 0. The output of the Delay Unit 777*a*, feeds via line ACC (N) which thus is representative of any of the outputs, for orders Q, P and 1 through 35, respectively, each of which feeds to a respective output terminal 8. Thus, it is seen that the output of the Adder may be gated to the Accumulator Register, and that the holding of the accumulator Register, may be shifted, left or right, a shift occurring at a rate of one order per microsecond.

It should also be noted, that the signal MQ (1) TO ACC (35) which feeds to terminal 3 of the accumulator Register order 35 (FIG. 1*d*) on occasions, as described above, when the Accumulator Register and the MQ are being shifted jointly, to the left, as one register, the signal, on the linee ACC (N−1) OUTPUT connected to terminal 4 (FIG. 4*f*) is actually coming from the MQ (1) output (FIG. 1*d*), while the signal to terminal 3 of the Accumulator Register 34 order, is actually the signal MQ (1) TO ACC (35) (FIGS. 1*g* and 1*d*).

There has also been described above, how signals on lines "(+) TO ACC(S)" and "(−) TO ACC(S)" will cause a direct insertion of a positivee or negative Sign, respectively, in the Accumulator Register Sign order. Whenever a regular SHIFT ACC LEFT signal is given, for a shift operation that does not include the MQ, as described below, then the line HOLD ACC, connected to terminal 7 of the Accumulator Register 35 order, is driven negative, as usual, and as the information is shifted left, since no binary 1, is shifted into the Accumulator Register order 35 from the MQ, then in effect, a binary 0 is stored in this Accumulator Register 35 order. In other words, if a signal called for a shift of 6 orders, and a binary 1 was present initially, in all Accumulator Register orders, then as the information is shifted left, binary 0's are effectively stored, in the Accumulator Register 35 order, and these binary 0's are shifted left, so that at the end of the 6 step shift operation, the last 6 orders of the Accumulator Register, namely, orders 30 through 35, all contain binary 0's.

The outputs of the Accumulator Register, via terminals 8, of the respective orders (FIG. 4*f*) are positive, to represent storage of binary 1's and negative to represent storage of binary 0's. These signals are fed (execept for orders P and Q) mainly to the Memory Buss Switches, as illustrated in FIGS. 1*d* and 1*e*.

(4) MULTIPLIER QUOTIENT REGISTER

Referring now to FIG. 1*g* it is seen that each order of the MQ is, for the purpose of this application, identical in detail, a representative circuit for these orders being illustrated in FIG. 4*g*. The Sign order, for example, of the MQ, may receive inputs from any one of three sources. One is a signal fed via line "(−) TO MQ (S)" of FIG. 1*g* to terminal 1, for the insertion of a binary 1, to store a negative Sign in the MQ Sign order. A second input is to the terminal 7, via the line MEM REG (S) and the signal on this line is gated by a control signal on the line MR to MQ (see also FIG. 4*g*) for gating the holding of the Memory Register "S" order to the MQ "S" order. A third input line HOLD MQ (S) feeds to terminal 8 of the S order of the MQ (FIG. 1*g*) and is used during gating of information, from the Memory Register to the MQ, and is also used, to insert a positive Sign indication, by breaking the recirculation loop of the Delay Unit, as described above, to thereby store a binary 0, which is the indication of a positive Sign. This HOLD MQ (S) line also goes negative, when a positive signal occurs on the line CLEAR MQ, as described above, which negative HOLD signal is effective, to erase the holding of the MQ register, that is, to set each order to zero.

The MQ 1 order via its input terminal 7 receives inputs from the Memory Register 1 order, via its input terminal 3 from the Accumulator Register 35 order, and via its input terminal 5 from the next lower MQ order 2. The MQ orders 2 through 34, have inputs to their respective terminals 7, from "corresponding" outputs of the Memory Register, inputs from the succeeding higher order, of the MQ, to terminal 3, and inputs from the succeeding lower order, of the MQ, to terminal 5. The MQ 35 order receives inputs from the Memory Register 35 order via its terminal 7. MQ order 35 also receives an input from the next higher order of the MQ, in this case, the MQ 34 order, via its terminal 3 and also receives a signal from the line "(1) TO MQ (35)" via its terminal 1, which last line signal is used for the insertion of a binary 1, in the MQ 35 order. Control signals applied to the MQ are as follows:

A signal via the line MR TO MQ, for "dumping" the holding of the Memory Register into the MQ, in corresponding bit orders. A signal via the line SHIFT MQ RIGHT, for shifting the holding of the MQ, to the right, and it should be noted that a signal on this last line is also effective to shift the holding of the Accumulator Register 35 order to the MQ 1 order. A signal via the line SHIFT MQ LEFT shifts the holding of the MQ, to the left, and a signal via the line CLEAR MQ acts, via the circuits described above, to cause the lines HOLD MQ (1–35) to go negative, respectively, and thereby erase the holding of all orders of the MQ.

Referring to FIG. 4*g*, there is illustrated, in detail, a representative MQ order. The circuitry illustrated is somewhat similar to the circuitry of the Accumulator Register orders, in that a Delay Unit, which in FIG. 4*g* is Delay Unit 787*a*, is the storage element per se, of the circuit. This Delay Unit 787*a* may receive an input via one of four AND circuits or via its terminal 1, feeding a line SET TO (1), which means that a binary 1 can thus be set directly, into the particular order of the MQ. As long as the line HOLD MQ, connected to terminal 8, is positive, the AND circuit 781*a* is conditioned, and positive outputs of the Delay Unit 787*a* are allowed to pass via this conditioned AND circuit 781*a*, an OR circuit 785*a* and a cathode follower 786*a* back to the Delay Unit, to thus provide, the recirculation path for a stored binary 1 bit. If a binary 1 is stored, a positive signal appears at the output of the Delay Unit and is thus recirculated. However, if a binary 0 is stored, the output of the Delay Unit, is negative, so that it cannot pass via the AND circuit 781*a*, such binary 0's being reproduced in the Delay Unit, as described aboxe. The line HOLD MQ is driven negative, to thus break the recirculation path and effectively, erase the holding of the Delay Unit, whenever a signal is emitted via a line CLEAR MQ (FIG. 1*g*) which produces a negative signal on the line HOLD MQ (FIGS. 1*g* and 4*g*) to thus erase the holding of the MQ storage element.

When a positive signal appears on line MR to MQ this signal (FIG. 1*g*) in addition to producing a negative signal on the line HOLD MQ, to break the recirculation path (FIG. 4*g*) also is fed via terminal 6 to the line MR TO MQ (FIG. 4*g*) to condition an AND circuit 782*a* so that a positive signal from the "corresponding" Memory Register order, applied to terminal 7 and thus to line MR (N) is fed to the OR circuit 785*a*, and thence via the cathode follower 786*a* to the Delay Unit.

When a positive signal is applied via terminal 4 to the line SHIFT MQ LEFT, the holding of the succeeding lower order of the MQ, fed to terminal 5 and applied to line MQ (N–1) passes via an AND circuit 783*a* and via the OR circuit 785*a* and the cathode follower 786*a* to the Delay Unit 787*a*, whereby the holding of the next lower order of the MQ is shifted left to the instant order. This shift is effective, as in the case of the Accumulator Register, to shift the bits, one position, for each microsecond that the line SHIFT MQ LEFT is positive, the line HOLD MQ being simultaneously negative, to break the recirculation of the stored bit, in the instant MQ order.

A positive input to terminal 2 is applied to line SHIFT MQ right to similarly shift bits, to the right, in orders 2 through 35 of the MQ or, in the case of the MQ 1 order, the input to terminal 3 is applied to line ACC (35), whereby the holding of the Accumulator Register order 35 is transferred to the Delay Unit 787*a* of MQ order 1 on a SHIFT MQ RIGHT.

With regard to the Sign order of the MQ, an input is made via input terminal 1 and line "(−) TO MQ (S)" of FIG. 1*g* instead of SET TO (1) of FIG. 4*g*, thus feeding a binary 0 which is an indication of a negative Sign into the MQ Sign order. At this time, the HOLD MQ voltage, remains positive, and the positive signal is fed, directly to the OR circuit 785*a*, so that a binary 1, representative of a negative Sign, is injected directly into the Delay Unit 787*a*. When it is necessary to store a positive Sign in the MQ Sign order, the line "(+) TO MQ (S)" (FIG. 1*g*), as described above, drives the line HOLD MQ (S) negative (FIG. 1*g* and labeled HOLD MQ in FIG 4*g*) to erase the holding of the Delay Unit, and thereby effectively store a binary 0, which is representative of a positive Sign.

Likewise, a binary 1 may be stored in the MQ 35 order, by a positive signal applied to the input terminal 1, to render line "(1) TO MQ (35)" positive (FIG. 1*g* and labeled SET TO (1) in FIG. 4*g*), which applies positive directly to the OR circuit 785*a* (FIG. 4*g*) to directly inject a binary 1 into the MQ 35 order, regardless of what was formerly stored in that order, the line HOLD MQ, remaining positive.

Thus, it is seen that the holding of the MQ can be erased, the holding of the Memory Register may be "dumped" into the MQ, the holding of the MQ may be shifted, left or right, jointly with the holding of the Accumulator Register and the MQ Sign order may be set, to represent a positive or a negative Sign, and the MQ 35 order, may be set, to represent a holding of a binary 1. The output of any Delay Unit, is positive, to represent a binary 1, or negative to represent a binary 0. Respective outputs of the various MQ orders feed via the respective output terminals 9 (FIGS 1*g* and 1*e*) to the Memory Buss Switches (FIG. 1*e*) to be described presently.

(5) MEMORY BUSS SWITCHES

Referring to the Memory Buss Switches, as represented in FIG. 1*e*, these are mere switching circuits, in that they do not contain any storage elements. The inputs to these Switches are from the Accumulator Register, as indicated in FIGS. 1*d* and 1*e* and also from the MQ, as indicated by the lines and cable, FIGS. 1*g* and 1*e*. If an Instruction STORE is given, with a full word Address, the Accumulator Register orders S, and 1 through 35, are fed via orders S, and 1 through 35 of the Memory Switches, to thereby place information on the Memory Busses S, and 1 through 35. If an even half word is Addressed, during a STORE operation, the same action takes place, that is, the outputs of orders S, and 1 through 35, of the Accumulator Register are gated, via the Memory Buss Switches, to the Memory Busses S, and 1 through 35. However, those cathode ray tubes which store the information received from Busses S, and 1 through 18 only, are unblanked, as described in said above identified application of Fox et al., during this even half word Address or in other words, the information, on the Memory Busses 18 through 35, is not delivered, to cathode ray tube storage. However, if an odd half Address is given, with a STORE Instruction, information from the Accumulator Register orders S, and 1 through 17 only, are gated by the Memory Buss Switches, to the Memory Busses 18 through 35, this switching being accomplished, as described presently, by the Memory Buss Switch orders 18 through 35. No information is gated to the Memory Busses S, and 1 through 17 with an odd half word Address. The same type of operation takes place on STORE MQ operations, depending upon whether the Address is for a full word or for an even or an odd half word. Thus, the Switch orders S, and 1 through 17, require two inputs only (neglecting control inputs), namely, one input from "corresponding" Accumulator Register orders, and one from "corresponding" MQ orders. However, orders 18 through 35, of the Memory Buss Switches, require 4 inputs (neglecting control inputs), that is, one from "corresponding" Accumulator Register orders, one from "corresponding" MQ orders, one from an Accumulator Register order N—18, where N is the Memory Buss Switch order number, and one from an MQ order N—18. The special case of the Memory Buss 18 order will be described below.

The four control signals which accomplish the switching for full or half words, as the case may be, are present, as needed, on the following lines: Line "ACC (S to 17) TO MEM BUS (18 to 35)" which feeds to terminal 3, respectively, of each Memory Switch Buss order 18 to 35 (only 35 being shown in FIG. 1*e*). This control signal, as described below, controls the transposition of bits, from orders S, and 1 to 17 inclusive of the Accumulator Register to the respective Memory Busses 18 to 35 inclusive, when an odd half word Address is selected. Line "ACC (S to 35) TO MEM BUSS (S to 35)" which feeds to terminal 1, of each Memory Buss Switch order S, and 1 through 35 is effective, when a full word Address is selected. Line "MQ (S to 35) TO MEM BUSS (S to 35)" applied to terminal 3, of each Memory Buss Switch order S, and 1 through 17 and to terminal 5 of orders 18 to 35 and is effective, where a full word Address is selected and information is being transferred, from the MQ orders S and 1 through 35 to the Memory Buss orders S and 1 through 35. Line "MQ (S to 17) TO MEM BUSS (18 to 35)" which feeds to terminal 7, of Memory Buss Switch orders 18 to 35 is effective to gate the holding of the MQ orders S and 1 through 17 to the respective Memory Busses, 18 through 35.

Referring to FIG. 4*h*, which illustrates a representative one of the Memory Buss Switches for orders 18 through 35, the four inputs, previously mentioned, are present. The output of the "corresponding" Accumulator Register order, represented by input terminal 2 and line ACC (N) (OUTPUT) comprises one input to the AND circuit 705*b*, whose other input is via terminal 1 and line "ACC (S to 35) TO MEM BUSS (S to 35)" which passes bits from all orders of the Accumulator Register to all orders of the Memory Busses. As stated above, and as described in said above identified application of Fox et al., with an even half word, the cathode ray tube orders 18 through 35 are not unblanked. Thus, during a full or an even half word Address, a positive signal on the line "ACC (S to 35) TO MEM BUSS (S to 35)" gates information from each order of the Accumulator Register to the corresponding Memory Buss order. The output of the AND circuit 705*b* passes via an OR circuit 709*b* and a power cathode follower 710*b* to the line MEM BUSS (N) representing a "corresponding" Memory Buss connected to the output terminal 9.

An AND circuit **706*b* is conditioned via terminal 3 and the line "ACC (S to 17) TO MEM BUSS (18 to 35)" whereby the output of the Accumulator Register order N—18 (where N represents the particular Memory Buss Switch order) is fed through this conditioned AND circuit 706*b*, when an odd half word is Addressed, at which time, as described above, the line "ACC (S to 17) TO MEM BUSS (18 to 35)" goes positive. The output of this AND circuit 706*b* passes via the OR circuit 709*b* and the power cathode follower 710*b*** to the corresponding Memory Buss. Thus, when an odd half word is called for, the Accumulator Register order outputs S and 1 through 17 are gated to the respective Memory Busses 18 to 35. It is to be noted particularly that the bit, stored in the S order of the Accumulator Register appears on Memory Buss 18.

The AND circuit **707*b* is conditioned via terminal 5 and line "MQ (S to 35) TO MEM BUSS (S to 35)" whereby the output from the "corresponding" MQ order, as represented by the terminal 6 and line MQ (N) OUTPUT, passes via this conditioned AND circuit 707*b* and via the cathode follower 709*b* and the power cathode follower 710*b*, to the corresponding Memory Buss orders whether a full or a half word is Addressed, the operation being identical to that described in connection with the AND circuit 705*b***, when the Instruction is STORE, with either a full or a half word Address. Where an even half word is Addressed, again the cathode ray tubes for orders 18 to 35 are not unblanked.

The AND circuit **708*b* is conditioned, via terminal 7 and line "MQ (S to 17) TO MEMORY BUSS (18 to 35)" when an odd half word is Addressed, to thus permit bits, applied to terminal 8 and line MQ (N—18) output, from these so designated orders of the MQ to pass via the conditioned AND circuit 708*b*, the OR circuit 709*b* and the power cathode follower 710*b***, to a MEM BUSS (N) output and to terminal 9, whereby data, in the respective MQ orders S, and 1 through 17, with an odd half word Address is passed, respectively, to Memory Buss orders 18 to 35, inclusive.

Referring to FIG. 4*i*, there is illustrated a representative Memory Buss Switch for orders S, and 1 through 17. The AND circuit **701*b*, via input terminal 2 and line ACC (N) OUTPUT, receives a signal from a "corresponding" order of the Accumulator Register which, when the terminal 1 and line "ACC (S to 35) TO MEM BUSS (S to 35)" is positive, is passed through the AND circuit and via an OR circuit 703*b* and a power cathode follower 704*b*** to Memory Buss (N) and to terminal 9, this terminal being, of course, connected to a "corresponding" Memory Buss order.

The AND circuit **702*b*, is conditioned, via the terminal 3 and line "MQ (S to 35) TO MEM BUSS (S to 35)" whereby an input to terminal 4 and line MQ (N) OUTPUT is passed to the OR circuit 703*b* and the power cathode follower 704*b***, to Line MEM BUSS (N) and to terminal 9, which as stated above, is connected to a "corresponding" Memory Buss order.

Thus, it is seen that full or half words may be read from the Accumulator Register orders and via the Memory Buss Switches and Memory Busses, to Memory, during STORE operations, with full or with EVEN or ODD half words, or may be read from the MQ orders, to Memory, via the Memory Buss Switches and the Memory Busses.

TIMING DIAGRAM OF VARIOUS OPERATIONS

The Timing Diagram of FIGS. 3*f* and 3*g*, with FIG. 3*f* above FIG. 3*g*, illustrates the timing of the respective control signals, for gating information from Memory to the Memory Register, from the Memory Register to the Adder, from the Adder to the Accumulator Register, from the Accumulator Register, in True or in Complement form, to the Adder; also from the Memory Register to the MQ and from the Accumulator Register and the MQ, through the Memory Buss Switches, to the Memory Busses and thence to Memory. The various timing signals are also illustrated for causing a SHIFT of the Accumulator Register and the MQ to the right or the left, the holding of the respective Registers, being shifted, one order, for each microsecond that the particular control signals are positive.

Various other signals illustrated in this Timing Diagram of FIGS. 3*f* and 3*g* have been utilized in circuits described above. For example, the End of Operation signal (FIG. 3*f* and also FIG. 3*g*) which is a two microsecond signal occurring during certain Execute or Execute/Regenerate cycles, is effective to signal the End of Operation. At the same time, as an End of Operation occurs, this signal is emitted to the Instruction Counter, described above, for stepping that counter, one count, so that as the Machine enters an Instruction cycle, the next Instruction Read, will be the succeedingly numbered Instruction. An exception occurs on TRANSFER operations, as will be described below. Another signal STEP INST CTR, shown in the Timing Diagram (FIG. 3*f* and also FIG. 3*g*) is for the purpose of stepping the Address Counter, this Address Counter being stepped, one count, for each microsecond and the particular signal, calling for the stepping of the Address Counter is positive.

RULES GOVERNING ADDITION

Before proceeding to a discussion of the ADD Timing diagram, illustrated on FIG. 3*a*, a few of the rules for binary addition, as performed by this machine, will now be stated. During an ADD operation, the factors are added algebraically, so that if the Signs are unlike, the value, stored in the Accumulator Register is Complemented to a 1's Complement, and is added, in the Adder, to the True value of the number stored in the Memory Register. By such an addition of a Complement number to a True number, subtraction is actually performed.

If, in this ADD operation, the Signs are unlike, and the 1's Complement of the value stored in the Accumulator Register is added, in the Adder, to the True value of the number stored in the Memory Register, and an END CARRY is produced, an "elusive 1" must be added in order that a correct result be obtained.

Thus the following rules for ADD may be stated:

*Rule 1.*—If the Accumulator Register and the Memory Register Signs are alike, add the Accumulator Register value, in True form, to the Memory Register True value.

*Rule 2.*—If the Accumulator Register and Memory Register Signs are unlike, add the 1's Complement of the Accumulator Register value, to the Memory Register True value.

*Rule 3.*—If the Accumulator Register and the Memory Register Signs are alike, the Accumulator Register Sign is left unchanged.

*Rule 4.*—If the Accumulator Register and the Memory Register Signs are unlike, and (a) If NO End Carry results, it is an indication, that the value in the Accumulator Register was the larger, and the SUM, now in the Accumulator Register, is in Complement form. Therefore, it is necessary to Recomplement the present Accumulator Register factor and leave the Sign of the Accumulator Register, unchanged.

(b) If there is an End Carry, it is an indication, that the value in the Memory Register was the larger, so that the SUM, now in the Accumulator Register, is in True form, but an "elusive 1" must be added to the result and the Sign, of the Accumulator Register, must be changed.

ADD

Referring now to Timing Diagram for ADD, illustrated in FIG. 3*a*, it is seen, from the labeling, that during Instruction time, an 19 (D1) signal, gates a half word ADD Instruction, from Memory, via the Memory Buss to the Memory Register and, at I10 (D1) time, this ADD Instruction is "dumped" from the Memory Register into the Instruction Register. The Operation Decoder, determining that the operation is ADD, causes the Control Circuits to emit a GO TO EXECUTE signal, at I11 (D1) time, sending the Machine into an Execute cycle.

During this Execute cycle, specifically at E9 (D1) time, as indicated by all the labeling in FIG. 3*a* for this signal, a full, an even half word, or an odd half word is Read, out of Memory, via the Memory Busses to the Memory Register, and at E11 (D1) time, a GO TO EX/RGN signal is emitted, sending the Machine into an Execute/Regenerate cycle. The purpose of the Execute cycle, is to Read the full or half word, in Memory, into the Memory Register, preparatory to dumping this full or half word, into the Accumulator Register. The word Read, out of Memory, is Read from THE Address, specified by the Address portion of the ADD Instruction. The Execute/Regenerate cycle is required so that the actual addition can take place. During this Execute/Regenerate cycle, an E/R 1 (D4) signal is emitted, as indicated by its labeling, for gating the holding of the Memory Register to the Adder. The factor, in the Accumulator Register, is also gated to the Adder at E/R 1 (D4) time, in True or in Complement form, depending upon the Signs of the two factors, as indicated by the labeling in FIG. 3*a*. If the Signs are alike, the value in the Accumulator Register is gated, in True form, to the Adder, but if the Signs are unlike, the value, in the Accumulator Register, is gated, in Complement form, to the adder, either operation taking place, under control of an E/R 1 (D4) signal. Thus, by passing the value from the Memory Register to the Adder, and the value from the Accumulator Register, in True or in Complement form, to the Adder, an actual addition takes place. Because of the inherent nature of the Delay Units of the Adder, Carries, throughout the Adder, are propagated at a rapid rate, and, therefore, if an END CARRY ensues, it occurs almost immediately.

If the Signs are alike, and the Adder 1 order emits a Carry signal, it is an indication of an Overflow, and the Carry output, of the Adder 1 order, is gated to the Overflow trigger by an E/R 1 (D4) signal, to turn ON the Overflow trigger.

However, if the Signs are unlike, a Complement of the value from the Accumulator Register is gated to the Adder, and if an End Carry occurs from the Q order, under this latter condition, it is an End Carry and under Rule 4*b*, set out above, it is necessary to add an elusive 1 in the Adder 35 order, at approximately E/R 1 (D4) time. After allowing 3 microseconds, for propagation of carries, which 3 microseconds provides a large safety factor, an E/R 4 (D1) signal is emitted, as indicated in FIG. 3*a*, to gate the Sum, from the Adder, to the Accumulator Register.

As described above, this Sum, may be in True or in Complement form. If the Signs are unlike, and no End Carry resulted, then under Rule 4*a* above, it is known that the data in the Accumulator Register is in Complement form. Therefore, it is necessary to Recomplement the number, so that the final value, stored in the Accumulator Register, at the end of the ADD operation, is in True form. To produce this Re-Complement operation, an E/R 7 (D2) signal is emitted as indicated in FIG. 3*a* for passing the holding of the Accumulator Register, in Complement form, to the Adder. At this time, there is no other input to the Adder, so the effect is to merely pass information, through the Adder, in order to Complement the value. At E/R 8 (D1) time, a signal is emitted, to gate the Re-Complemented output of the Adder, to the Accumulator Register, so that the Recomplementing operation is complete.

If the "original" Sum gated from the Adder to the Accumulator Register was in True form, then there was a carry from the Q order and this Recomplementing operation is NOT required.

At E/R 10 (D1) time, the Accumulator Register Sign order is set positive or negative, as required by the algebraic rules of addition. Thus, if the Signs of the Accumulator Register and the Memory Register, are unlike, and an End Carry resulted, the Sign of the Accumulator Register is changed, as indicated by Rule 4*b*, above. Therefore, if the Sign of the Accumulator Register is positive, a negative Sign must be stored in the Accumulator Register Sign order, by a 1 microsecond signal, occurring at E/R 10 time, labeled, as shown in FIG. 3*a* "(−) TO ACC (S)" whereby the Sign is changed, as described in connection with FIG. 4*e*, above by injecting a binary 1 directly into the Sign order, a binary 1 indicating a Minus Sign. If the Accumulator Register Sign is negative, under the same conditions, the signal emitted at E/R 10 (D1) time, is labeled "(+) TO ACC (S)" as illustrated in FIG. 3*a*, which, as described above, renders the line HOLD ACC (S) of FIG. 4*e*, minus to thereby insert a binary 0, in the Sign order of the Accumulator Register, which binary 0 is indicative of a positive Sign.

Thus, it is seen that if the Signs are unlike, and if an End Carry did result, the Accumulator Register Sign is changed. At E/R 10 (D2) time, the End of Operation signal is given, and the Instruction Counter is stepped, one count.

In the following examples of ADD operations, the Memory Register is illustrated as though its capacity was 4 bits only, to the right of the binary point, instead of the actual 35, and the same is true of the Accumulator Register. Both Overflow positions, respectively, are also indicated.

*Example 1.—Accumulator register and memory register signs alike*

(A)

| | |
|---|---|
| Accumulator Register | +00.0101 |
| Memory Register | + .1101 |
| Result in Accumulator Register | +01.0010 |

Note: An Overflow occurred, beyond the binary point, and this is noted, by turning ON the Overflow trigger, as described above.

(B)

| | |
|---|---|
| Accumulator Register | −00.0101 |
| Memory Register | − .0011 |
| Result in Accumulator Register | −00.1000 |

*Example 2.—Accumulator register and memory Register signs unlike*

(A)

| | | |
|---|---|---|
| Accumulator Register | +00.0101 | |
| Complemented Accumulator Register | 11.1010 | |
| Memory Register | −.0111 | |
| | C00.0001 | Since End Carry |
| | 1 | add "elusive 1" and |
| Result in Accumulator Register | −00.0010 | change Sign (Rule 4*b*) |

(B)

| | | |
|---|---|---|
| Accumulator Register | +00.0101 | |
| Complemented Accumulator Register | 11.1010 | |
| Memory Register | −.0011 | |
| | NC11.1101 | Since no End Carry |
| Result in Accumulator Register | +00.0010 | Recomplement Accumulator and leave Sign unchanged (Rule 4*a*) |

(C)

| | | |
|---|---|---|
| Accumulator Register | +00.0101 | |
| Complemented Accumulator Register | 11.1010 | |
| Memory Register | −.0101 | |
| | NC11.1111 | Since no End Carry |
| Result in Accumulator Register | +00.0000 | Recomplement Accumulator and leave Sign unchanged (Rule 4*a*) |

(D)

| | | |
|---|---|---|
| Accumulator Register | −00.0101 | |
| Complemented Accumulator Register | 11.1010 | |
| Memory Register | +.0101 | |
| | NC11.1111 | Since no End Carry |
| Result in Accumulator Register | −00.0000 | Recomplement Accumulator and leave Sign unchanged (Rule 4*a*) |

(E)

| | | |
|---|---|---|
| Accumulator Register | −00.0000 | |
| Complemented Accumulator Register | 11.1111 | |
| Memory Register | +.0000 | |
| | NC11.1111 | Since no End Carry |
| Result in Accumulator Register | −00.0000 | Recomplement Accumulator and leave Sign unchanged (Rule 4*a*) |

In the examples, given above, Example 1A, illustrates a situation in which the Accumulator Register and the Memory Register signs are both positive, so that when the values are added, an Overflow occurs. Example 1B illustrates a situation in which the Accumulator Register and Memory Register signs are both negative, and when the values are added, to obtain a Sum no Overflow occurs.

Example 2A illustrates a situation in which the Accumulator Register sign is positive, the Memory Register sign is negative and its value is greater than that of the Accumulator Register. In this instance, an End Carry does occur, so an "elusive 1" is added to the Sum obtained from adding the Complement of the value in the Accumulator Register to the value in the Memory Register, to thus obtain the final Sum, and the Sign of the Accumulator Register is changed. Example 2B illustrates a situation in which the Accumulator Register sign is positive, the Memory Register sign is negative and the value in the Memory Register is greater than the value in the Accumulator Register. Upon addition of the Complement of the number in the Accumulator Register, to the number in the Memory Register, no End Carry results, so the Sum, in the Accumulator Register is a Complement number, and Recomplementing is necessary to obtain a True value in the Accumulator Register, and its sign is left unchanged. Example 2C illustrates a situation in which the sign of the Accumulator Register is positive, the sign of the Memory Register is negative, and the numeric values are equal. Upon addition of the Complement of the value in the Accumulator Register to the value in the Memory Register, no End Carry results. Since no End Carry results, the Sum, reaching the Accumulator Register is Recomplemented, to contain a True value and the sign of the Accumulator Register is left unchanged, that is, it is left, as a positive Sign. This operation gives a result of a positive zero. The example shown under 2D above, illustrates a problem wherein the sign of the Accumulator Register is negative, the sign of the Memory Register is positive and the numeric values are equal. Again, adding the Complement of the value in the Accumulator Register, to the value in the Memory Register, provides a Sum, for which no End Carry occurs. Since there is no End Carry, the value is Recomplemented, and the sign of the Accumulator Register is left unchanged. This leaves a negative zero. Example 2E illustrates a problem in which a negative zero in the Accumulator Register is added to a positive zero, in the Memory Register. During the addition of the Complement of value in the Accumulator Register, to the value in the Memory Register, no End Carry occurs, and it is necessary to Recomplement the sum reaching the Accumulator Register, and to leave the sign, unchanged, the result being a negative zero. The problems illustrated under 2C, 2D, and 2E, respectively, indicate how the Machine operates, on either a positive or a negative zero quantity.

LONG SHIFT LEFT

Referring to FIG. 3*b*, which illustrates the Timing Diagram for a LONG SHIFT LEFT operation, the function of this operation is to shift the contents of the Accumulator Register and the MQ, jointly, as one Register, any desired number of places, to the left, from 0 to 255. Neither the Sign bit of the Accumulator Register nor the Sign bit of the MQ is shifted. As is seen, from an inspection of FIG. 3*b*, the half word Instruction is gated, at I9 (D1) time, from the Memory Busses to the Memory Register, and at I10 (D1) time, the half word is gated, to the Instruction Register. The Address portion, of this Instruction, indicates the number of places, which the Accumulator Register and the MQ are to be jointly shifted during the execution of this Instruction. As stated above, this number is between 0 and 255, and is stored in the Address Counter portion of the Instruction Register. For each order that the Accumulator Register and the MQ are jointly shifted, the Address Counter is stepped, one count. As stated above, since the Address Counter, is a count down counter, it will count down to zero, when the required number of shifts has taken place. Hence, during this operation, the shifts continue until the Address Counter counts down to zero, which is an indication that the required number of shifts has taken place.

At I11 (D1) time, a GO TO EX/RGN signal is emitted, to send the Machine into Execute/Regenerate cycles. During these Execute/Regenerate cycles, as long as the Address Counter does not reach zero, positive signals are emitted, at E/R 1 (D8) time, to lines SHIFT ACC LEFT, SHIFT MQ LEFT, MQ (1) TO ACC (35) and STEP ADR CTR. The signals on the first three lines are effective, for each microsecond that the respective lines are positive, to cause the Accumulator Register and the MQ, acting as one Register, to shift, one step, to the left. At the same time, a positive signal, on the line STEP ADR CTR, steps the Address Counter, one count, per each microsecond. Thus it is seen, that during the Execute/Regenerate cycles, the Accumulator Register and MQ may be jointly shifted, 8 orders, to the left, for each such cycle. This process continues until such time as the Address Counter goes to zero, at which time the signal, on all lines, goes negative. This may take various numbers of Execute/Regenerate cycles. For example, if a shift of 28 places, was required, it would require 3 full Execute/Regenerate cycles, and during the fourth such Execute/Regenerate cycle, the signals on the respective lines will go negative at E/R 5 time, as indicated by the dotted portion, in FIG. 3*b*, of the signals on these lines, which represents any last Execute/Regenerate cycle. While the shift operation is taking place, as long as the Address Counter does not reach zero, and whenever the Accumulator Register 1 order contains a binary 1, the output of the Accumulator Register 1 order is connected to the Overflow trigger, to turn it ON, as the binary 1 is shifted, to the left, into the Overflow positions. Therefore, whenever a binary 1, is shifted past the Accumulator Register 1 order, to the Overflow orders, the Overflow trigger is turned on, to indicate that an Overflow has occurred. During the LONG SHIFT LEFT operation, the holding of the MQ is effectively shifted, into and perhaps out of, the Accumulator Register, but in any event, the Accumulator Register Sign is set, to the holding of the MQ Sign, therefore, if the MQ Sign is positive, a positive SIGN is stored in the Accumulator Register Sign order, by an E/R 10 (D1) signal, as indicated by the labeling in FIG. 3*b*, but if the Accumulator Register Sign is negative, a negative Sign is stored in the Accumulator Register Sign order. Signals for storing a positive or a negative Sign, as the case may be, into the Accumulator Register Sign order, occur during an Execute/Regenerate cycle, but of course, only the first such signal is effective to store the Sign indication. The End of Operation signal and the signal, for stepping the Instruction Counter, one count, occur at E/R 10 (D2) time, during that Execute/Regenerate cycle, during which the Address Counter reaches zero. As the Address Counter reaches zero, the number of shifts required, has taken place, and therefore the Ends of Operation signal may be properly given.

LONG SHIFT RIGHT

Refer now to FIG. 3*c*, which illustrates the Timing Diagram for a LONG SHIFT RIGHT operation. This operation is somewhat similar to the LONG SHIFT LEFT operation, except that the shifting of the Accumulator Register and the MQ is jointly, to the right, rather than to the left, and no signals are required, to be gated, to the Overflow trigger, since the binary 1's will be shifting in a direction, away from the Overflow position, and also, during a LONG SHIFT RIGHT operation, the Accumulator Register Sign is transferred, to the MQ sign order.

At I9 (D1) time of the Instruction time, a half word is gated, as indicated by the labeling in FIG. 3*c*, from the Memory Busses to the Memory Register. This half word Instruction is then gated, from the Memory Register to the Instruction Register, at I10 (D1) time. The number of places or orders, which are to be shifted, for the execution of this Instruction, is stored in the Address Counter, because, in this operation, as stated above, the Address Counter portion, of the Instruction Register is utilized, to count the number of shifts, rather than to select a Memory Address.

At I11 (D1) time, a GO TO EX/RGN signal, is emitted, to send the Machine into Execute/Regenerate cycles. During each such Execute/Regenerate cycle, as long as the Address Counter does not contain zero, E/R 1 (D8) signals are emitted, to lines SHIFT ACC RIGHT and SHIFT MQ RIGHT, to cause a shifting of the Accumulator Register and the MQ, acting as one register, to the right, (exclusive of the Sign orders) and a signal is also emitted to the line, STEP ADR CTR to cause the Address Counter to be stepped, one step, for each microsecond that the respective lines are positive. As stated above, in the description of the LONG SHIFT LEFT operation, the process continues until the Address Counter, counts down to zero, at which time the shifting is terminated. If the Accumulator Register Sign is positive, a positive Sign, is stored in the MQ Sign order, by an E/R 10 (D1) signal, but if the Accumulator Register Sign is negative, a negative Sign is stored in the MQ Sign order. During the Execute/Regenerate cycle, in which Address Counter goes to zero, the End of Operation signal and the signal for stepping the Instruction Counter are emitted, at E/R 10 (D2) time. It should be noted, at this time, that no separate signal is necessary, for connecting the Accumulator Register 35 order to the MQ 1 order during this LONG SHIFT RIGHT operation, since this function is performed by the positive signal on the line SHIFT MQ RIGHT, as described above.

Thus, it is seen, that the holding of the Accumulator Register and the MQ, acting as one Register, may be shifted, to the RIGHT, a selected number of orders.

SHIFT ACCUMULATOR LEFT

The Timing Diagram for SHIFT ACCUMULATOR LEFT is illustrated in FIG. 3*d*. During this operation, the holding of the Accumulator Register ONLY, is shifted, to the LEFT, any desired number of places, from 0 to 255. The Sign bit, of the Accumulator Register is NOT shifted in the execution of this Instruction. At I9 (D1) time of the Instruction cycle, as indicated by the labeling of FIG. 3*d*, a half word Instruction is gated, from the Memory Busses to the Memory Register orders S, and 1 through 17, and this half word Instruction is thereafter gated, by an I10 (D1) signal, as indicated by the labeling, from the Memory Register to the Instruction Register, and at I11 (D1) a GO TO EX/RGN signal is emitted, sending the Machine into Execute/Regenerate cycles. The Instruction now in the Instruction Register is comprised of an Operation portion, and an Address portion. The Address portion indicates, the required number of shifts, and its setting is entered into the Address Counter of the Instruction Register, as described above, to set the counter, to count the desired number of shift LEFT steps. During the Execute/Regenerate cycles, at E/R 1 (D8) time, as long as the Address Counter does NOT count down, to zero, positive signals are emitted, to lines SHIFT ACC LEFT and STEP ADR CTR, to cause the Accumulator Register ONLY, to be shifted, one order, to the LEFT, for each microsecond that the line is positive, and for stepping the Instruction Counter, one count, per microsecond. The signals are of a duration of 8 microseconds, as noted by E/R 1 (D8), so that the holding of the Accumulator Register is shifted, 8 orders to the LEFT, during EACH Execute/Regenerate cycle, until such time as the Address Counter goes to zero. As long as the Address Counter does NOT go to zero, and the Accumulator Register 1 order contains a binary 1, this Accumulator Register 1 order output is connected to the Overflow trigger, and is effective, during each shift, to turn it ON, thus indicating that a binary 1 has shifted, from the Accumulator Register 1 order, to the Overflow orders P and Q. The Sign, of the Accumulator Register, remains unchanged, whether it is positive or negative. At the same time that the Address Counter counts down to zero, the desired number of shifts has taken place, and the signals on the lines SHIFT ACC LEFT STEP ADR CTR and ACC (1) TO OV TRIG, go negative. During the last Execute/Regenerate cycle, which is THE cycle during which, the Address Counter counts down, to zero, an End of Operation signal is emitted, and a signal, for stepping the Instruction Counter is also emitted, at E/R 10 (D2) time.

Thus it is seen, that the Accumulator Register ONLY, may be shifted, to the LEFT by an Instruction SHIFT ACCUMULATOR LEFT, this Instruction thus differing from LONG SHIFT LEFT, in that the MQ, is NOT shifted.

SHIFT ACCUMULATOR RIGHT

The Timing Diagram, for SHIFT ACCUMULATOR RIGHT, is illustrated in FIG. 3*e*. AT I9 (D1) time, of the Instruction cycle, as indicated by the labeling, a half word SHIFT ACCUMULATOR RIGHT Instruction, is gated, from the Memory Busses to the Memory Register orders S, and 1 through 17, and at I10 (D1) time, this Instruction is gated, from the Memory Register to the Instruction Register, the Address Counter portion of the Instruction Register, thereby being set to the number, indicative of the required number of steps of shift, to take place.

At I11 (D1) time, a GO TO EX/RGN signal is emitted, sending the machine into Execute/Regenerate cycles. During these Execute/Regenerate cycles, the holding of the Accumulator Register is shifted, 8 orders, to the RIGHT, for each such cycle, until such time as the Address Counter counts down, to zero. At "1" time, of each Execute/Regenerate cycle, an E/R 1 (D8) signal is emitted, and applies positive potential to lines, SHIFT ACC RIGHT and STEP ADR CTR, to cause a shifting of the Accumulator Register ONLY, 1 order, for each microsecond that the line is positive, while the E/R 1 (D8) signal, fed to the line STEP ADR CTR, causes the Address Counter to be stepped down, one count, each microsecond. Therefore when the required number of steps of shift has taken place, the Address Counter is at zero, and the signals, on both said lines, go negative. During the LAST Execute/Regenerate cycle, which is THE Cycle, during which the Address Counter counts down, to zero, an End of Operation signal is emitted, at E/R 10 (D2) time and a signal is also emitted, to step the Instruction Counter.

Thus it is seen that the holding of the Accumulator Register ONLY may be shifted to the RIGHT a number of orders, from 0 to 255. The Sign of the Accumulator Register is NOT shifted during this operation. This Instruction differs from the LONG SHIFT RIGHT operation in that the MQ is NOT shifted.

While there has been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims:

What is claimed is:

1. In combination, a first plural order storage means comprising a plurality of storage elements for storing a plurality of binary 1 or binary 0 bit representations selectively, and a sign storage means for storing a manifestation of a sign; and a source of shifting signals; and means connected to said storage elements and to said shifting signals source, operable by said shifting signals for shifting the respective representations in said plurality of storage elements, a desired number of steps, in either one of two desired directions, said shifting means excluding said sign order from said shifting operation, whereby the contents of said respective storage elements may be altered but the sign manifestation remains unaltered.

2. A combination as in claim 1 and including an overflow trigger, and means connected to said overflow trigger and to said storage elements, for flipping said overflow trigger when a binary bit representation is shifted in one chosen direction out of the highest order of said plural order storage means.

3. A combination as in claim 2, said storage means further comprising plurality of overflow orders; whereby said means connected to said storage means and to said overflow trigger for flipping said trigger, will flip said trigger when a bit representation is shifted to said overflow orders in said one direction but leave said trigger unflipped, when a bit representation is shifted out of said overflow orders to said highest order of said plural order storage means.

4. A combination as in claim 1 and including a second plural order storage means including a sign order and plurality of value orders, means connecting the lowest value order of said first plural order storage device to the highest value order of said second storage device, and means associated with said connecting means and said shifting signal source effective to shift the contents of said lowest order to said highest order, in one direction of shift, and the contents of said highest order to said lowest order, in the other direction of shift, whereby both said storage devices operate as a single device during said shifting as a single device.

5. A combination as in claim 4, and including means connected to said first and second storage means for setting the sign order of said first storage means to the sign of said second storage means, upon shifting from the second to the first; and means connected to said first and second storage means for setting the sign of said second storage means to the sign of said first storage means, upon shifting from the first storage means to said second storage means.

References Cited by the Examiner

UNITED STATES PATENTS

| | | | |
|---|---|---|---|
| 2,510,485 | 6/50 | Vossberg | 328—45 |
| 2,583,102 | 1/52 | Holden | 328—44 |
| 2,700,502 | 1/55 | Hamilton et al. | 328—37 |
| 2,735,005 | 2/56 | Steele | 328—44 |
| 2,781,968 | 2/57 | Chenus | 328—164 |
| 2,798,156 | 7/57 | Selmer | 328—37 |
| 2,823,855 | 2/58 | Nelson | 328—37 |
| 2,922,985 | 1/60 | Crawford | 328—44 |
| 2,968,439 | 1/61 | Rajchman et al. | 328—37 |

JOHN W. HUCKERT, *Primary Examiner.*

GEORGE N. WESTBY, *Examiner.*